United States Patent
Clark et al.

(10) Patent No.: US 10,293,547 B2
(45) Date of Patent: May 21, 2019

(54) ELECTROSTATIC 3-D PRINTER USING LAYER AND MECHANICAL PLANER

(71) Applicant: Xerox Corporation, Norwalk, CT (US)

(72) Inventors: Robert A. Clark, Williamson, NY (US); Michael F. Zona, Webster, NY (US); William J. Nowak, Webster, NY (US); Chu-heng Liu, Penfield, NY (US); Jorge A. Alvarez, Webster, NY (US); Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 137 days.

(21) Appl. No.: 15/176,040

(22) Filed: Jun. 7, 2016

(65) Prior Publication Data

US 2017/0348909 A1    Dec. 7, 2017

(51) Int. Cl.
*B29C 64/188* (2017.01)
*B29C 64/393* (2017.01)
(Continued)

(52) U.S. Cl.
CPC .......... *B29C 64/188* (2017.08); *B29C 64/106* (2017.08); *B29C 64/141* (2017.08); *B29C 64/20* (2017.08); *B29C 64/214* (2017.08); *B29C 64/393* (2017.08); *B29C 64/40* (2017.08); *B33Y 10/00* (2014.12); *G03G 15/1605* (2013.01); *G03G 15/224* (2013.01); *G05B 19/4099* (2013.01); *B29C 64/223* (2017.08); *B29K 2105/251* (2013.01); *B29K 2995/001* (2013.01);
(Continued)

(58) Field of Classification Search
CPC ...... B29C 64/188; B29C 64/214; B33Y 10/00
See application file for complete search history.

(56) References Cited

U.S. PATENT DOCUMENTS

| 5,010,368 A | 4/1991 | O'Brien |
| 5,689,763 A | 9/1997 | Rathbun et al. |

(Continued)

FOREIGN PATENT DOCUMENTS

WO    2013/044047 A1    3/2013

OTHER PUBLICATIONS

European Application No. 17174394.1, European Search Report dated Oct. 30, 2017, pp. 1-8.
(Continued)

*Primary Examiner* — Jacob T Minskey
*Assistant Examiner* — Melody Tsui
(74) *Attorney, Agent, or Firm* — Gibb & Riley, LLC

(57) ABSTRACT

A three-dimensional (3-D) printer includes build and support material development stations positioned to transfer layers of build and support materials to an intermediate transfer surface. The intermediate transfer surface transfers a layer of the build and support materials to a platen each time the platen contacts the intermediate transfer surface. A sensor detects the thickness of the layer on the platen, and a mechanical planer is positioned to contact and level the layer on the platen as the platen moves past the mechanical planer. Additionally, a feedback loop is electrically connected to the sensor and the mechanical planer. The mechanical planer adjusts the amount of the build material and the support material removed from the layer based on the thickness of the layer on the platen, as determined by the sensor.

20 Claims, 22 Drawing Sheets

(51) Int. Cl.
*B29C 64/141* (2017.01)
*B29C 64/40* (2017.01)
*G05B 19/4099* (2006.01)
*G03G 15/16* (2006.01)
*G03G 15/22* (2006.01)
*B33Y 10/00* (2015.01)
*B29C 64/106* (2017.01)
*B29C 64/20* (2017.01)
*B29C 64/214* (2017.01)
*B33Y 30/00* (2015.01)
*B33Y 40/00* (2015.01)
*B33Y 50/02* (2015.01)
*B29K 105/00* (2006.01)
*B29C 64/223* (2017.01)

(52) U.S. Cl.
CPC .............. *B33Y 30/00* (2014.12); *B33Y 40/00* (2014.12); *B33Y 50/02* (2014.12); *G05B 2219/35134* (2013.01); *G05B 2219/49007* (2013.01)

(56) References Cited

U.S. PATENT DOCUMENTS

| | | | |
|---|---|---|---|
| 6,066,285 | A | 5/2000 | Kumar |
| 6,775,504 | B2 | 8/2004 | Godlove et al. |
| 7,250,238 | B2 | 7/2007 | Fromm et al. |
| 7,270,408 | B2 | 9/2007 | Odell et al. |
| 7,851,549 | B2 | 12/2010 | Sacripante et al. |
| 8,459,280 | B2 | 6/2013 | Swanson et al. |
| 8,470,231 | B1 | 6/2013 | Dikovsky et al. |
| 8,488,994 | B2 | 7/2013 | Hanson et al. |
| 8,784,723 | B2 | 7/2014 | Napadensky |
| 9,017,589 | B2 | 4/2015 | Kritchman et al. |
| 9,023,566 | B2 | 5/2015 | Martin |
| 9,193,110 | B2 | 11/2015 | Pridoehl et al. |
| 2010/0121476 | A1 | 5/2010 | Kritchman |
| 2012/0276233 | A1 | 11/2012 | Napadensky |
| 2013/0075013 | A1 | 3/2013 | Chillscyzn et al. |
| 2013/0077996 | A1 | 3/2013 | Hanson et al. |
| 2013/0186558 | A1* | 7/2013 | Comb .................. G03G 15/169 156/277 |
| 2014/0134334 | A1 | 5/2014 | Pridoehl et al. |
| 2015/0024169 | A1 | 1/2015 | Martin |
| 2015/0024317 | A1 | 1/2015 | Orrock et al. |
| 2015/0142159 | A1 | 5/2015 | Chang |
| 2015/0145174 | A1 | 5/2015 | Comb |
| 2015/0266241 | A1* | 9/2015 | Batchelder ............ B29C 64/188 264/484 |
| 2017/0299973 | A1* | 10/2017 | Frauens .................. B29C 70/74 |

OTHER PUBLICATIONS

U.S. Appl. No. 15/150,601, Notice of Allowance dated Oct. 4, 2018, pp. 1-2.
http://www.keyence.com/products/meausre/laser-2d/lj-v/index.jsp. Accessed on May 10, 2016.
http://www.automationtechnology.de/cms/en/3d-sensors-for-scans-by-means-of-laser-triangulation/. Accessed on May 10, 2016.
http://www.micro-epsilon.com/laser-scanner/new-scanCONTROL-BL/index.html. Accessed on May 10, 2016.
http://www.cognex.com/products/machine-vision/ds-1000-displacement-sensor-laser-profiler/. Accessed on May 10, 2016.
http://lmi3d.com/. Accessed on May 10, 2016.
http://www.photonfocus.com/products/?no_cache=1&cid=2. Accessed on May 10, 2016.
https://en.ids-imaging.com/ensenso-stereo-3d-camera.html. Accessed on May 10, 2016.
http://www.vrmagic.com/imaging/3d-sensors/. Accessed on May 10, 2016.
http://www.vision-components.com/fileadmin/user_upload/DE/flyer/20160324_28337nl_VCnano3D_DE-EN_web.pdf. Accessed on May 10, 2016.
http://www.chromasens.de/en/3d-line-scan-camera-3dpixa#. Accessed on May 10, 2016.
U.S. Appl. No. 15/150,585, Office Action Communication dated Nov. 3, 2017, pp. 1-17.
U.S. Appl. No. 15/150,585, Notice of Allowance dated Mar. 27, 2018, pp. 1-8.
U.S. Appl. No. 15/150,614, Office Action Communication dated Nov. 15, 2017, pp. 1-19.
U.S. Appl. No. 15/150,614, Notice of Allowance dated Mar. 21, 2018, pp. 1-8.

* cited by examiner

ELECTROSTATIC 3-D PRINTER USING LAYER AND MECHANICAL PLANER

BACKGROUND

Systems and methods herein generally relate to three-dimensional (3-D) printing processes that use electrostatic printing processes.

Three-dimensional printing can produce objects using, for example, ink-jet printers. In one exemplary process, a platen moves relative to an ink-jet to form a layer of build and support material on the platen, and each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency, and digital nature of printing systems.

SUMMARY

Exemplary three-dimensional (3-D) printers include, among other components, an intermediate transfer surface, such as a drum or intermediate transfer belt (ITB), and build and support material development stations positioned to transfer (e.g., electrostatically or mechanically) build and support material to the ITB. The build and support material development stations transfer layers of the build and support materials to the ITB.

A transfuse station is adjacent the ITB, and a platen having a flat surface is positioned to repeatedly contact the ITB. The platen moves relative to the ITB, and the ITB transfers a layer of the build and support materials to the flat surface of the platen each time the platen contacts one of the layers on the ITB at the transfuse station to successively form a freestanding stack of the layers on the flat surface of the platen.

A sensor detects the thickness of the layer on the platen, and a mechanical planer is positioned to contact and level the layer on the platen as the platen moves past the mechanical planer. The mechanical planer makes the top of the layer parallel to the flat surface of the platen and reduces the thickness of the layer. Additionally, a feedback loop is electrically connected to the sensor and the mechanical planer. The mechanical planer adjusts the amount of the build material and the support material removed from the layer based on the thickness of the layer on the platen, as determined by the sensor.

In one example, the mechanical planer is an angled blade (e.g., a blade positioned at a non-parallel and non-perpendicular angle to the flat surface of the platen). Further, such a blade is movable, and an actuator is connected to the movable blade. The actuator moves the movable blade toward and away from the platen. Also, a cleaning structure is located in a fixed position, and the cleaning structure contacts and cleans the movable blade as the actuator moves the movable blade past the cleaning structure. This structure can additionally include a collection tray adjacent the mechanical planer. The collection tray is positioned to collect the build and support material removed from the layer by the mechanical planer.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, electrostatic printing process are well-known means of generating two-dimensional (2-D) digital images, and the methods and devices herein use such processing for the production of 3-D items (for 3-D printing). However, when performing 3-D printing using electrostatic processes (especially those that use an ITB), the thickness uniformity and surface characteristics of each layer should be controlled to produce a well formed, accurate final 3-D part. Once the layers are placed on top of each other, any non-uniformity in the thickness of the individual layers, or mis-registration between the part and support material creates a malformed and/or objectionable final part due to the additive nature of the non-uniformities.

In view of such issues, the devices herein perform a leveling process to ensure the dimensional accuracy of the final part, as well as, the part-to-part repeatability. The devices herein use a leveling process for improving part uniformity in a 3-D printing architecture using electrophotography.

To provide good development and transfer properties, the particle size distribution of build and support material should be tight and stable, to ensure uniform layer thickness. However, larger size particles create voids and non-uniformity in each layer that must be dealt with in the transfuse assembly. Small errors in each individual layer accumulate to larger dimensional errors after thousands of layers are fused together. For example, just a 1% error of each layer (e.g., using layers around 10 um thick) to build a part 10 cm tall, would introduce the error as large as 1 mm. With devices herein, a mechanical device (e.g., a mechanical planerizer) that utilizes an angled blade, removes any excess thickness of the layer of build and support material, thereby leveling the freshly transfused layer.

After a layer is transfused onto the part, the structure can be heated to complete the fusing process. Immediately afterward, the stack of layers is shuttled past the mechanical planerizer to remove any excess material while the newly transfused layer is still soft. The layer is then cooled, and then the platen is shuttled back to be preheated in preparation for the next layer to be transfused. While the mechanical planerizer could also be applied after the layer has been cooled, the reaction loads on the blade are higher in that type of processing.

Figure 1:
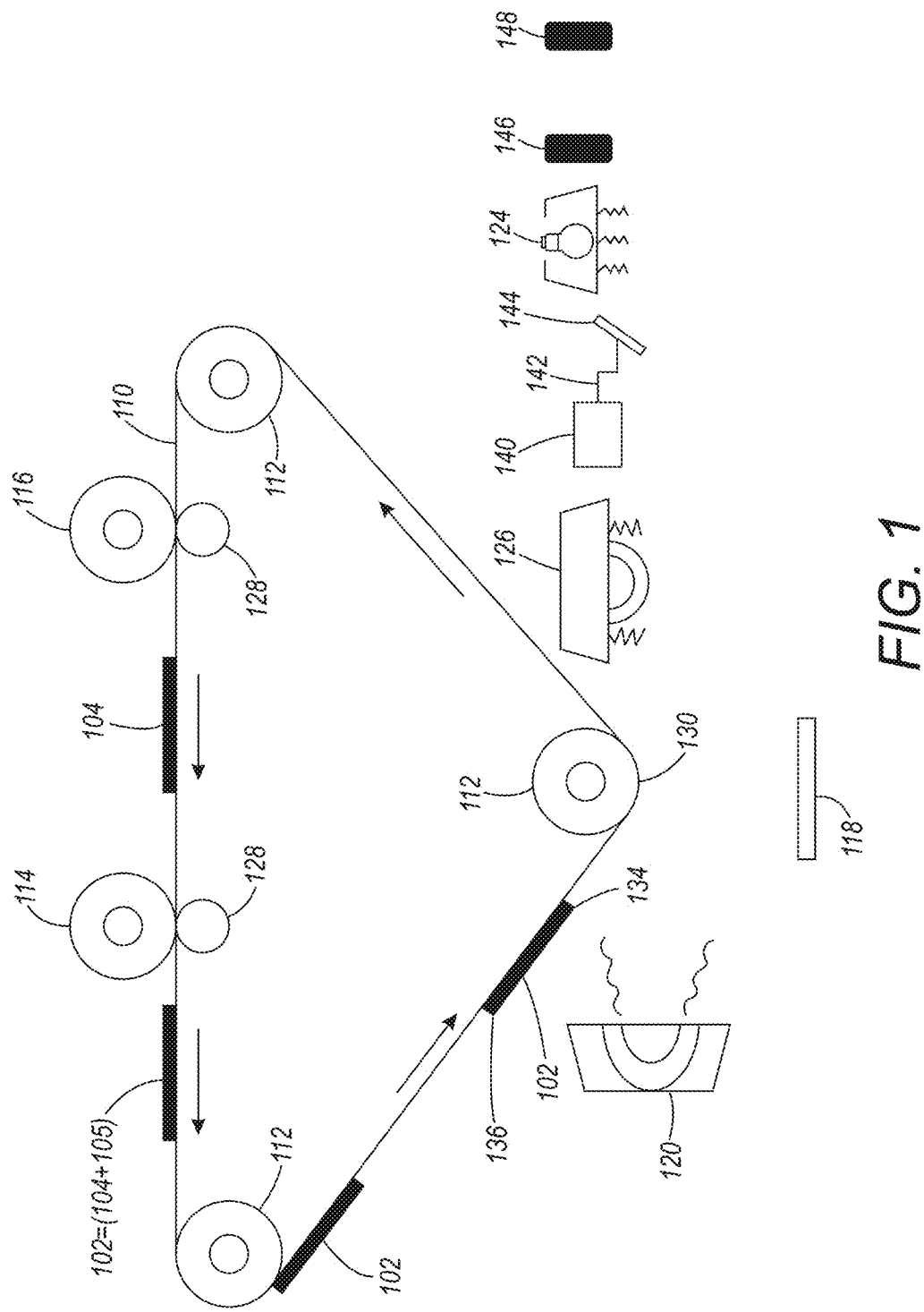
FIGS. 1-11 are schematic cross-section diagrams partially illustrating printing devices herein.

As shown, for example, in FIG. 1, exemplary three-dimensional (3-D) printers herein include, among other components, an intermediate transfer surface, such as an intermediate transfer belt 110 (ITB) supported on rollers 112, a first printing component (e.g., development device 116), and a second printing component (e.g., development device 114). Thus, as shown in FIG. 1, the first printing component 116 is positioned to electrostatically transfer (by way of charge difference between the belt (produced by charge generator 128, for example) and the material being transferred) a first material 104, the build material, such as a (potentially dry) powder polymer-wax material (e.g., charged 3-D toner) to the ITB 110. The second printing component 114 (which can also be, for example, a photoreceptor) is also positioned to electrostatically transfer a second material 105 (e.g., the support material, again such as a powder polymer-wax material (e.g., charged 3-D toner)) to a location of the ITB 110 where the first material 104 is located on the ITB 110.

The support material 105 dissolves in solvents that do not affect the build material 104, to allow the printed 3-D structure 104 to be separated from the support material 105 after the full 3-D item is complete. In the drawings, the combination of the build material 104 and the support material 105 is shown as element 102, and is sometimes referred to as a "developed layer." The developed layer 102 of the build material 104 and the support material 105 is on a discrete area of the ITB 110 and is in a pattern corresponding to the components of the 3-D structure in that layer (and its associated support elements), where the 3-D structure is being built, developed layer 102 by developed layer 102.

Additionally, a platen 118 (which can be a surface or belt) is adjacent the ITB 110. Patterned layers 102 of build and support material are transferred from the development devices 114, 116 to the intermediate transfer belt 110, and eventually to the platen 118 at a transfuse station 130.

As shown in FIG. 1, the transfuse station 130 is adjacent the ITB 110. The transfuse station 130 includes a roller 112, on one side of the ITB 110, supporting the ITB 110. The transfuse station 130 is positioned to receive the layers 102 as the ITB 110 moves to the transfuse station 130. More specifically, the build material development station 116 the support material development station 114, and the transfuse station 130 are positioned relative to the ITB 110 such that a layer 102 on the ITB 110, when the ITB 110 is moving in a process direction, first passes the build material and support material development stations 114, 116, and then passes the transfuse station 130.

As further shown in FIG. 1, such structures can include a transfuse heater 120, an optional fusing station 126, an optional curing station 124, and an optional cooling station 146. The fusing station 126 applies pressure and/or heat to fuse the most recently transfused layer 102 to the platen 118 or the layers present on the platen 118. The curing station 124 is positioned to apply light (e.g. UV light) using a light source and/or heat using a heater to cure the layers. The cooling station 146 blows potentially cooled air on the layer that has just been fused and cured. The structure can also include a support material removal station 148.

FIG. 1 also illustrates a mechanical planer 144 is also separate from the ITB 110 and is positioned to contact and level the freestanding stack so as to make the top of the layer parallel to the flat surface of the platen 118. The mechanical planer 144 reduces the thickness of the freestanding stack. The mechanical planer 144 comprises an elongated structure (e.g., an angled blade) and there is relative movement between the mechanical planer 144 and the platen 118 in a direction parallel to the flat surface of the platen 118. FIG. 1 also illustrates a feedback loop 142 that is electrically connected to a thickness sensor 140 and the mechanical planer 144. In some structures, the mechanical planer 144 adjusts the amount of the build material and the support material removed from the layer based on the thickness of the layer on the platen 118, as determined by the sensor 140.

Figure 2:
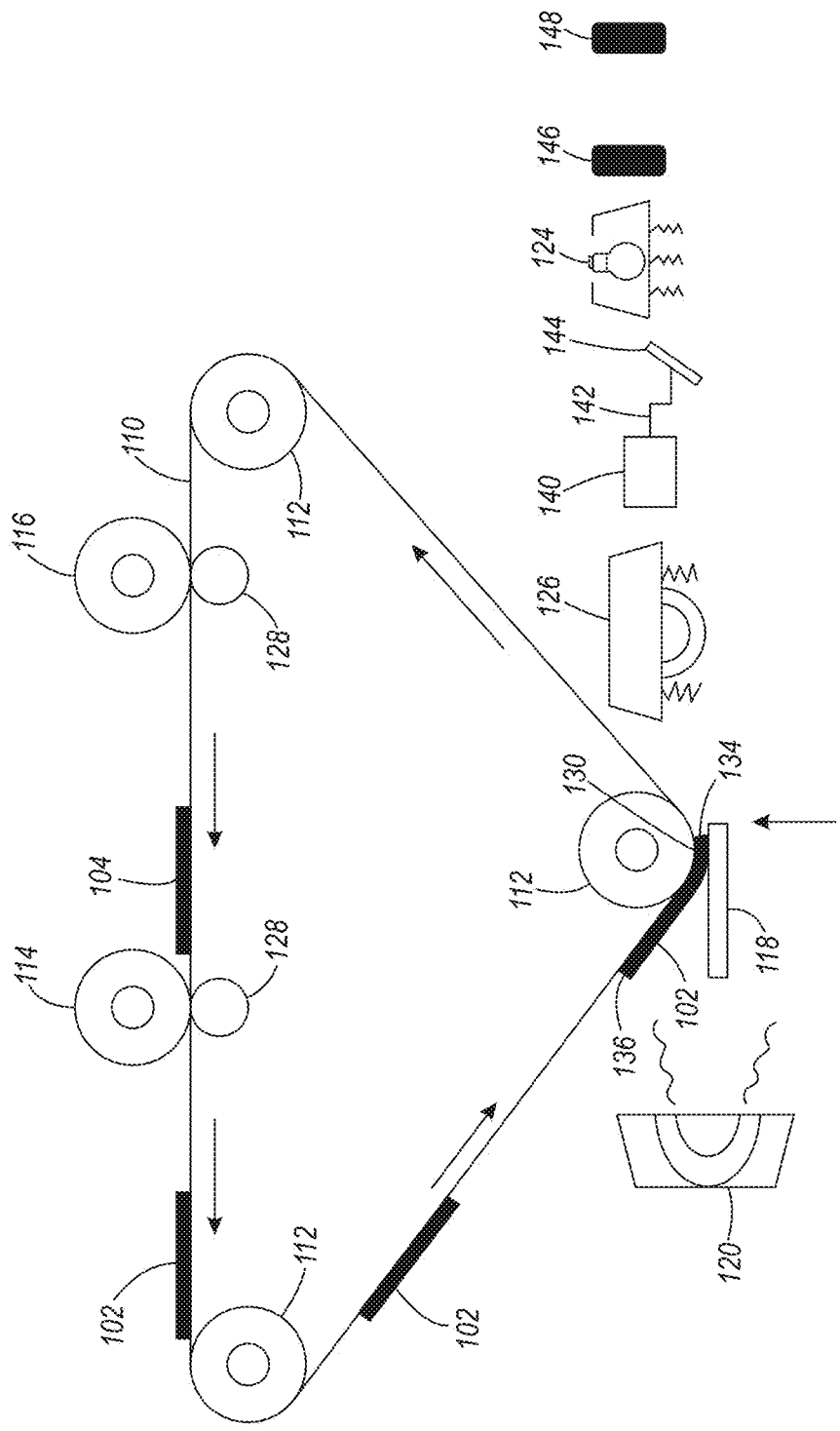

As shown by the vertical arrow in FIG. 2, the platen 118 moves (using motors, gears, pulleys, cables, guides, etc. (all generally illustrated by item 118)) toward the ITB 110 to have the platen 118 make contact with the ITB 110. The developed layer 102 and ITB 110 can optionally be locally heated by heater 120 to further help bring the developed layer 102 to a "tacky" state prior to transfuse. In one example, the developed layer 102 can be heated to a temperature higher than the glass transition temperature (Tg) but short of the melt or fuse temperature (Tm) of the support and build materials, to allow the support and build materials to become tacky to assist in transferring the layers 102 to the platen 118 (or to existing layers 102 on the platen 118).

The platen 118 can also optionally be heated by heater 120 to approximately the same temperature, and then be contacted synchronously with the tacky layer 102 as it translates through the ITB-platen nip (the transfuse nip 130). Thereby, the ITB 110 transfers one of the developed layer 102 of the build material 104 and the support material 105 to the platen 118 each time the platen 118 contacts the ITB 110, to successively form developed layers 102 of the build material 104 and the support material 105 on the platen 118.

Therefore, the build and support material that is electrostatically printed in a pattern on the ITB by each separate development device 114, 116, is combined together in the developed layers 102 to represent a specific pattern having a predetermined length. Thus, as shown in FIG. 2, each of the developed layers 102 has a leading edge 134 oriented toward the processing direction in which the ITB 110 is moving (represented by arrows next to the ITB 110) and a trailing edge 136 opposite the leading edge 134.

More specifically, as shown in FIG. 2, at the transfuse nip 130, the leading edge 134 of the developed layer 102 within the transfuse nip 130 begins to be transferred to a corresponding location of the platen 118. Thus, in FIG. 2, the platen 118 moves to contact the developed layer 102 on the ITB 110 at a location where the leading edge 134 of the developed layer 102 is at the lowest location of the roller of the transfuse nip 130. Thus, in this example, the trailing edge 136 of the developed layer 102 has not yet reached the transfuse nip 130 and has not, therefore, yet been transferred to the platen 118.

Figure 3:
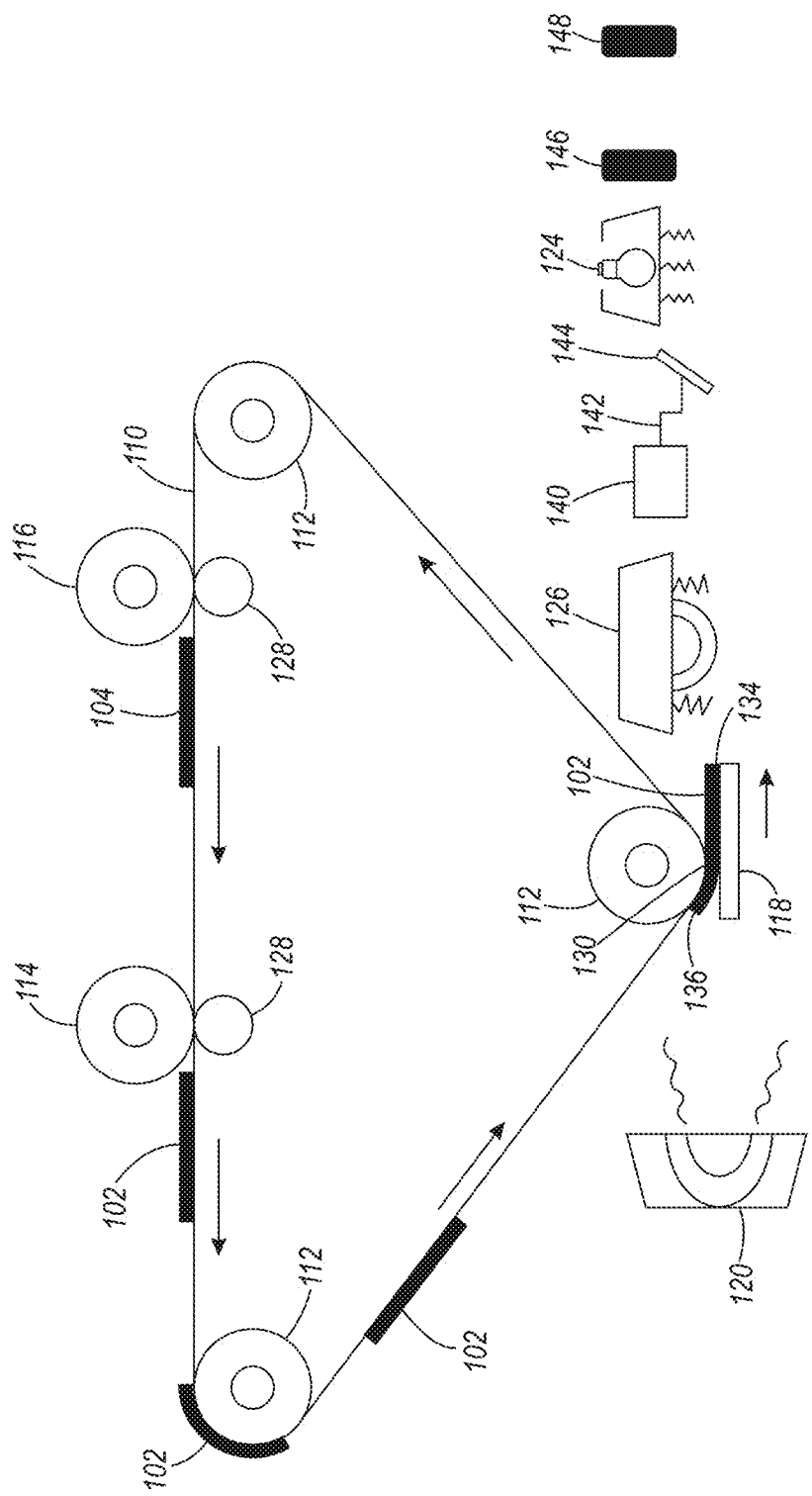

As shown in FIG. 3, the platen 118 moves synchronously with the ITB 110 (moves at the same speed and the same direction as the ITB 110) either by moving or rotating the platen vacuum belt, to allow the developed layers 102 to transfer cleanly to the platen 118, without smearing. In FIG. 3, the trailing edge 136 of the developed layer 102 is the only portion that has not yet reached the transfuse nip 130 and has not, therefore, been transferred to the platen 118.

Figure 4:
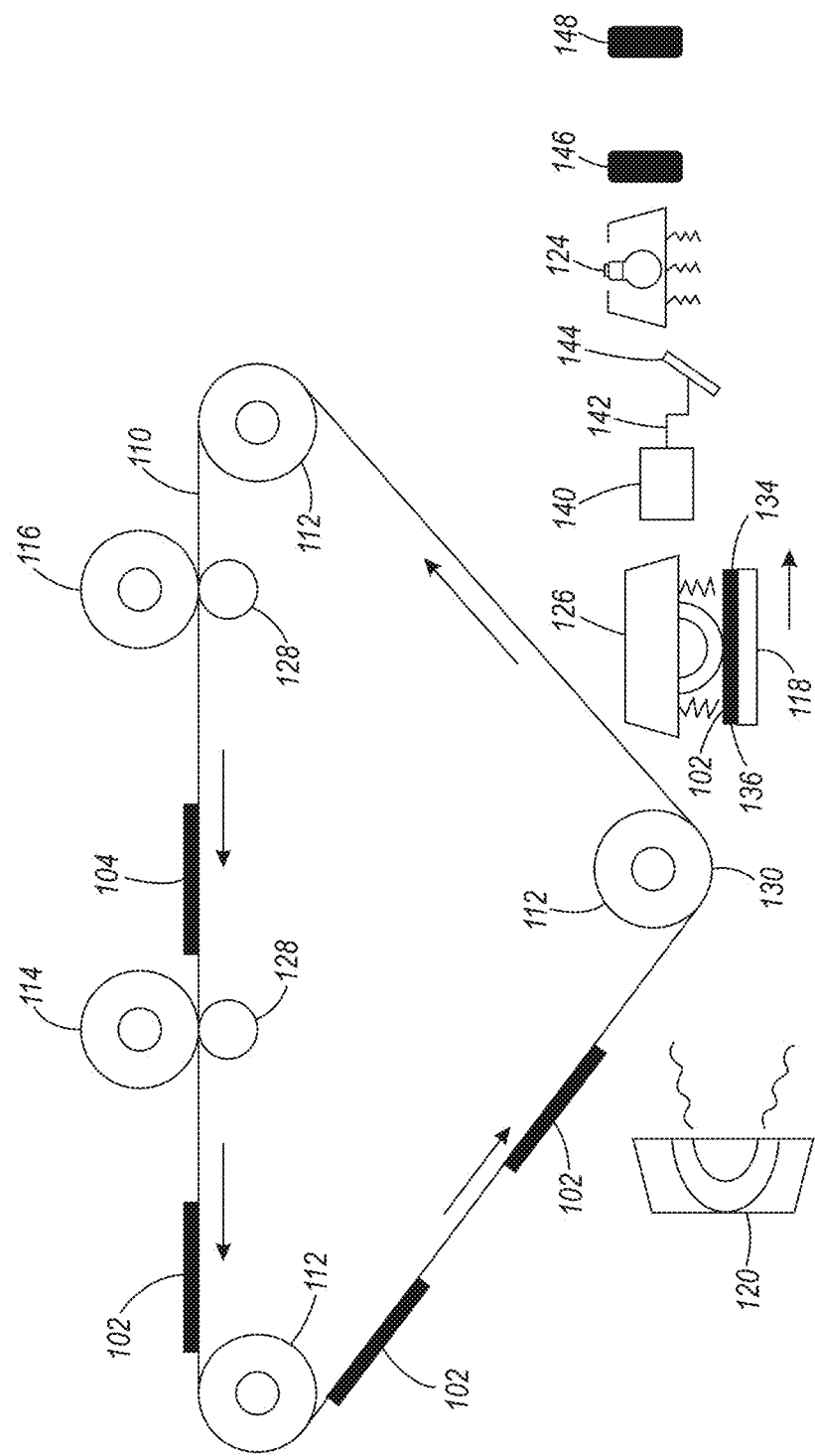

Then, as the ITB 110 moves in the processing direction, the platen 118 moves at the same speed and in the same direction as the ITB 110, until the trailing edge 136 of the developed layer 102 reaches the bottom of the roller of the transfuse nip 130, at which point the platen 118 moves away from the ITB 110 and over to the fusing station 126, as shown in FIG. 4. The fusing station 126 is optional (as all needed fusing can be performed by the transfuse station 130) and can be a non-contact (e.g., infrared (IR)) heater, or a pressure heater, such as a fuser roller that heats and presses the layer(s) 102. If the fusing station 126 is a pressure roller, the platen 118 moves synchronously as the roller rotates, heating and pressing to fuse the developed layer 102 to the platen 118. This synchronous movement between the platen 118 and the ITB 110 (and heated roller 126) causes the pattern of support and builds materials (102) that are printed by the development devices 116, 114 to be transferred precisely from the ITB 110 and fused to the other layers 102 on the platen 118, without distortion or smearing.

Figure 5:
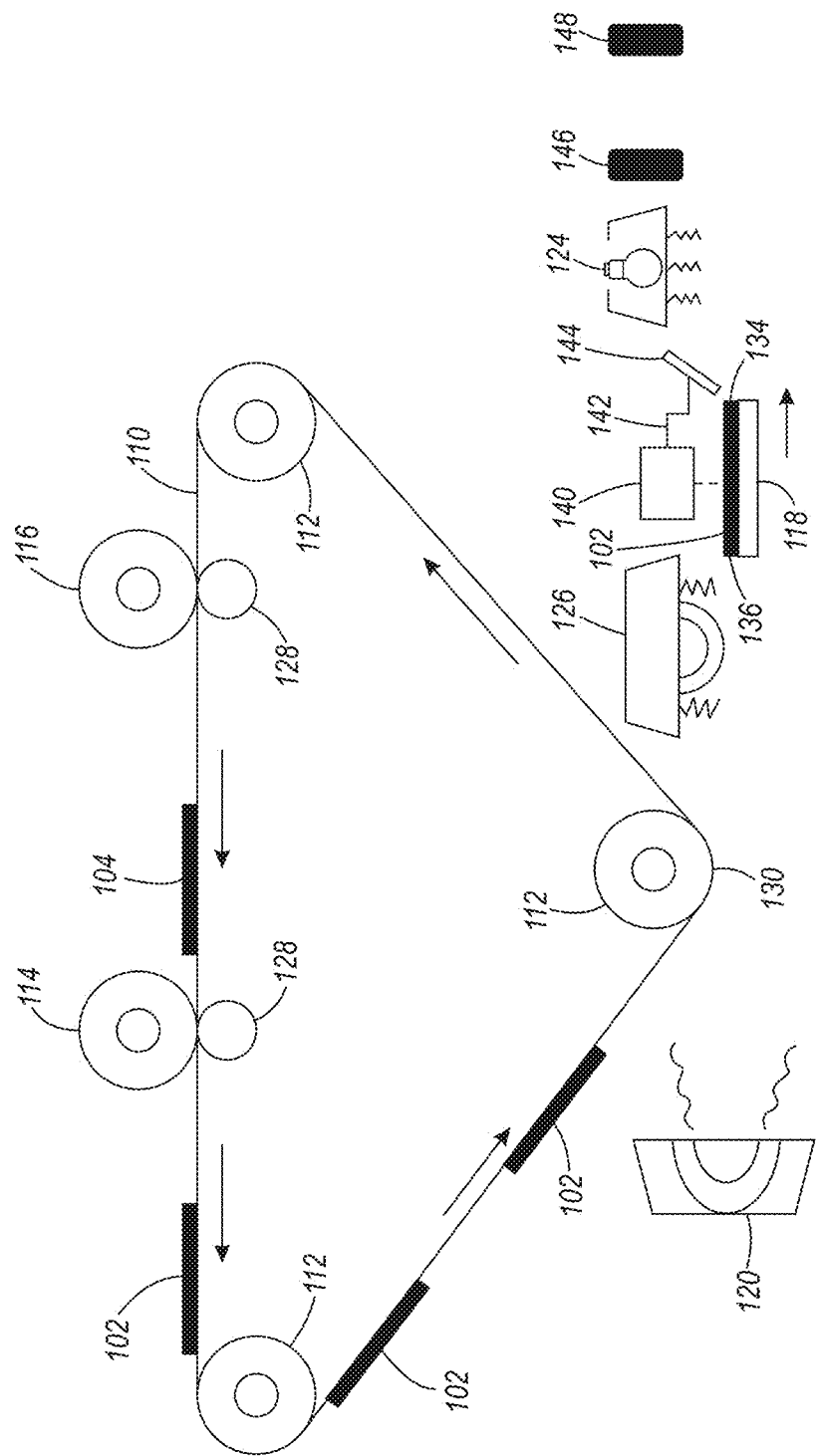

As shown in FIG. 5, the sensor 140 detects the thickness and topography of the layer on the platen. The sensor 140 can be any form of thickness measurement device including contact and non-contact devices, and is calibrated to only detect the thickness of the very top layer on the platen 118.

For example, the sensor 140 can include a laser and camera, and use laser profiling (laser triangulation), where object profiles are measured using a laser sheet-of-light (triangulation) technique. With laser profiling sensors 140, a laser line is projected on the object, and the resulting sensor image is evaluated by a camera core and converted into a single height profile by scanning the laser line over the object. Thus, a complete height image of the object can be acquired. The sensor 140 is capable of delivering position data as well as additional features (e.g., intensity, line width) without sacrificing profile speed.

In another example, the sensor 140 can use time-of-flight thickness measurement that creates distance data using the principle where the entire "scene" is captured with each laser or light pulse (again, using a laser source and camera). Here, a 3-D camera system covers distances from a few meters up to several meters, depending on the detector material being used. At the heart of the camera is an advanced sensor technology employing the time-of-flight distance measurement principle where infrared light from the camera's internal lighting source is reflected by objects in the scene and travels back to the camera where its precise time of arrival is measured independently by each of tens of thousands of sensor pixels.

Also, the sensor 140 can be a light sensor that uses structured light, where a light source projects a narrow band of light onto a three-dimensionally shaped surface to produce a line of illumination that appears distorted from other perspectives than that of the projector, and can be used for an exact geometric reconstruction of the surface shape (light section). The structured light sensor 140 can also provide a faster and more versatile process by projecting patterns consisting of many stripes at once, or of arbitrary fringes, as this allows for the acquisition of a multitude of samples simultaneously. Seen from different viewpoints, the pattern appears geometrically distorted due to the surface shape of the object.

Further, the sensor 140 can be a stereoscopic (stereo vision) system that uses two cameras displaced horizontally from one another. Together, these cameras obtain two different views of a scene from which a 3-D image can be reconstructed.

In another alternative, the sensor 140 can be a contact-based gelsight sensing device that has a slab of clear elastomer covered with a reflective skin. When an object presses on the reflective skin, the reflective skin distorts to take on the shape of the object's surface. When viewed from behind (through the elastomer slab), the reflective skin appears as a relief replica of the surface. A camera is included in the sensor 140 to record an image of this relief, using illumination from red, green, and blue light sources at three different positions. A photometric stereo algorithm that is tailored to the device is then used to reconstruct the surface.

Figure 6:
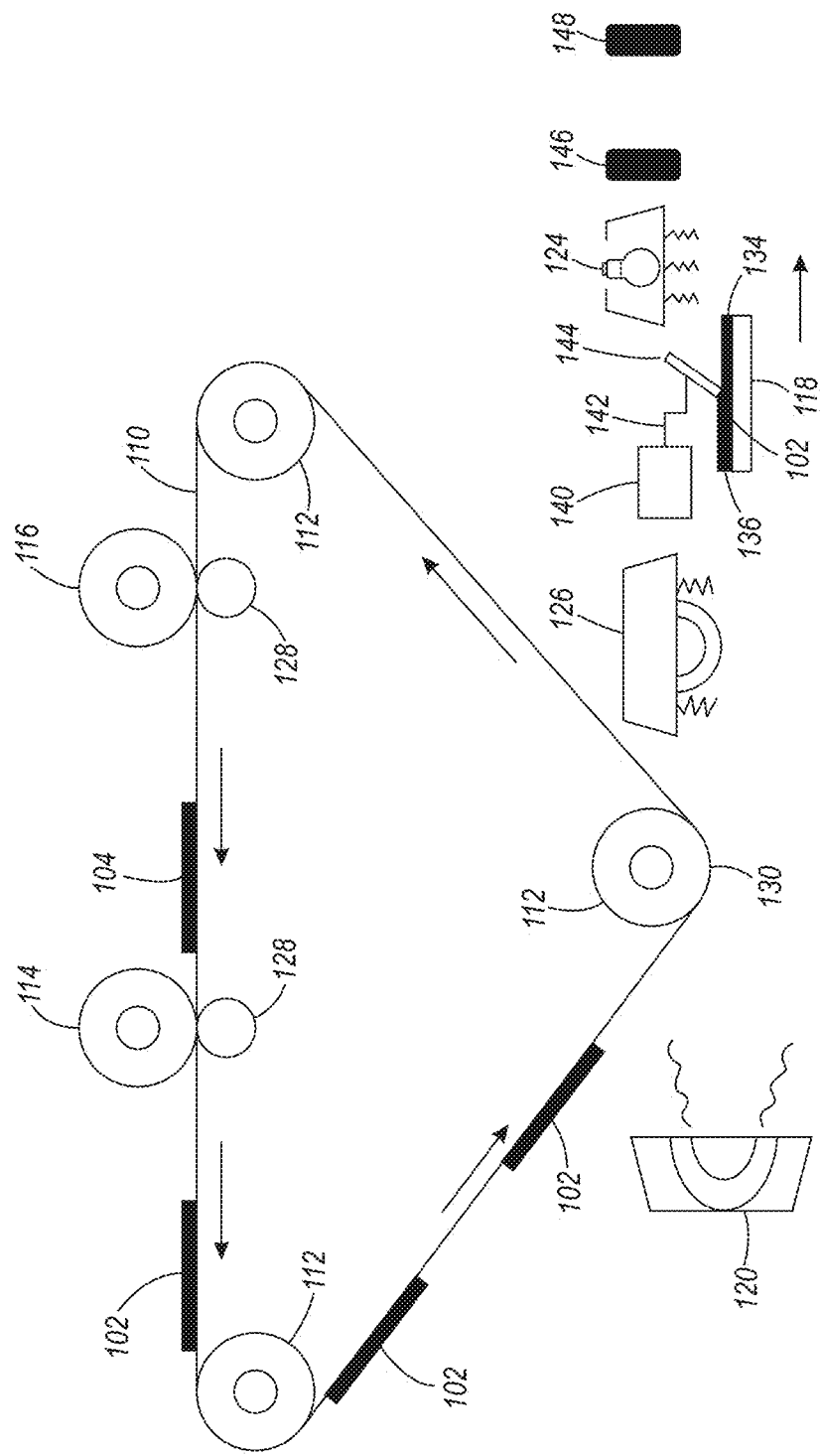

As shown in FIG. 6, the mechanical planer 144 is positioned to contact and level the layer 102 on the platen 118 as the platen 118 moves past the mechanical planer (as shown by the horizontal arrow in FIG. 6). The mechanical planer 144 makes the top of the layer 102 parallel to the flat surface of the platen 118 and reduces the thickness of the layer 102. The feedback loop 142, that is electrically connected to the sensor 140 and the mechanical planer 144, allows the mechanical planer 144 to adjust the amount of build and support material removed from the layer 102 based on the thickness/topography of the layer 102 on the platen 118, as determined by the sensor 140.

Figure 7:
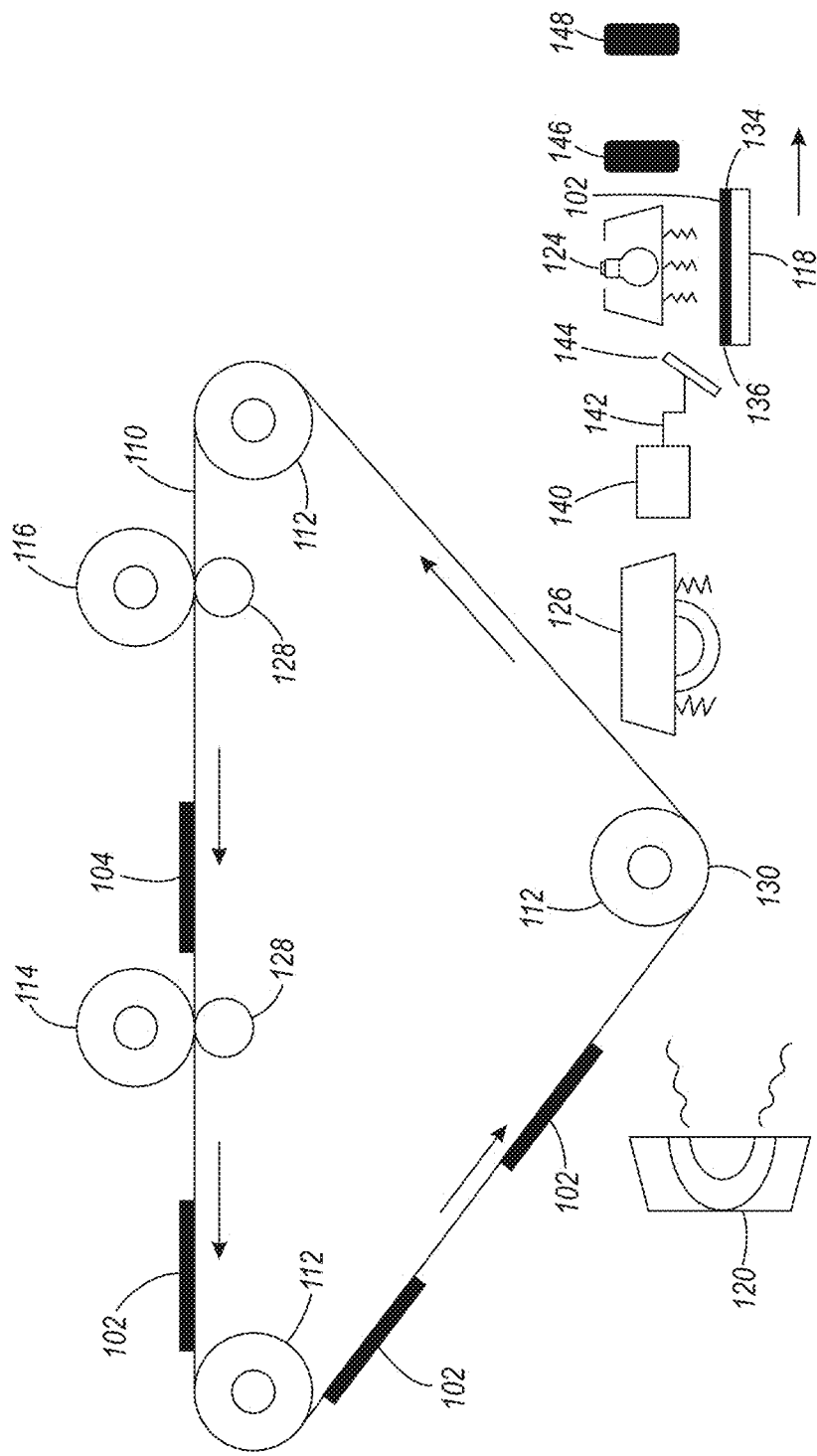

As shown in FIG. 7, the platen moves to the optional curing station 124, which applies light and/or heat to the 3-D structure to bond the developed layers 102 in the freestanding stack 106 to one another on the platen 118. The selective use of heaters, lights, and other components in the bonding station 124 will vary depending upon the chemical makeup of the developed layers 102. In one example, the build material 104 can include UV curable toners. Therefore, as shown in FIG. 7, in one example the curing station 124 can cure such materials 104 by heating the materials 104 to a temperature between their glass transition temperature and their melting temperature, and then applying UV light to cross-link the polymers within the materials 104, thereby creating a rigid structure. Those ordinarily skilled in the art would understand that other build and support materials would utilize other bonding processing and bonding components, and that the foregoing is presented only as one limited example; and the devices and methods herein are applicable to all such bonding methods and components, whether currently known or developed in the future.

Figure 8:
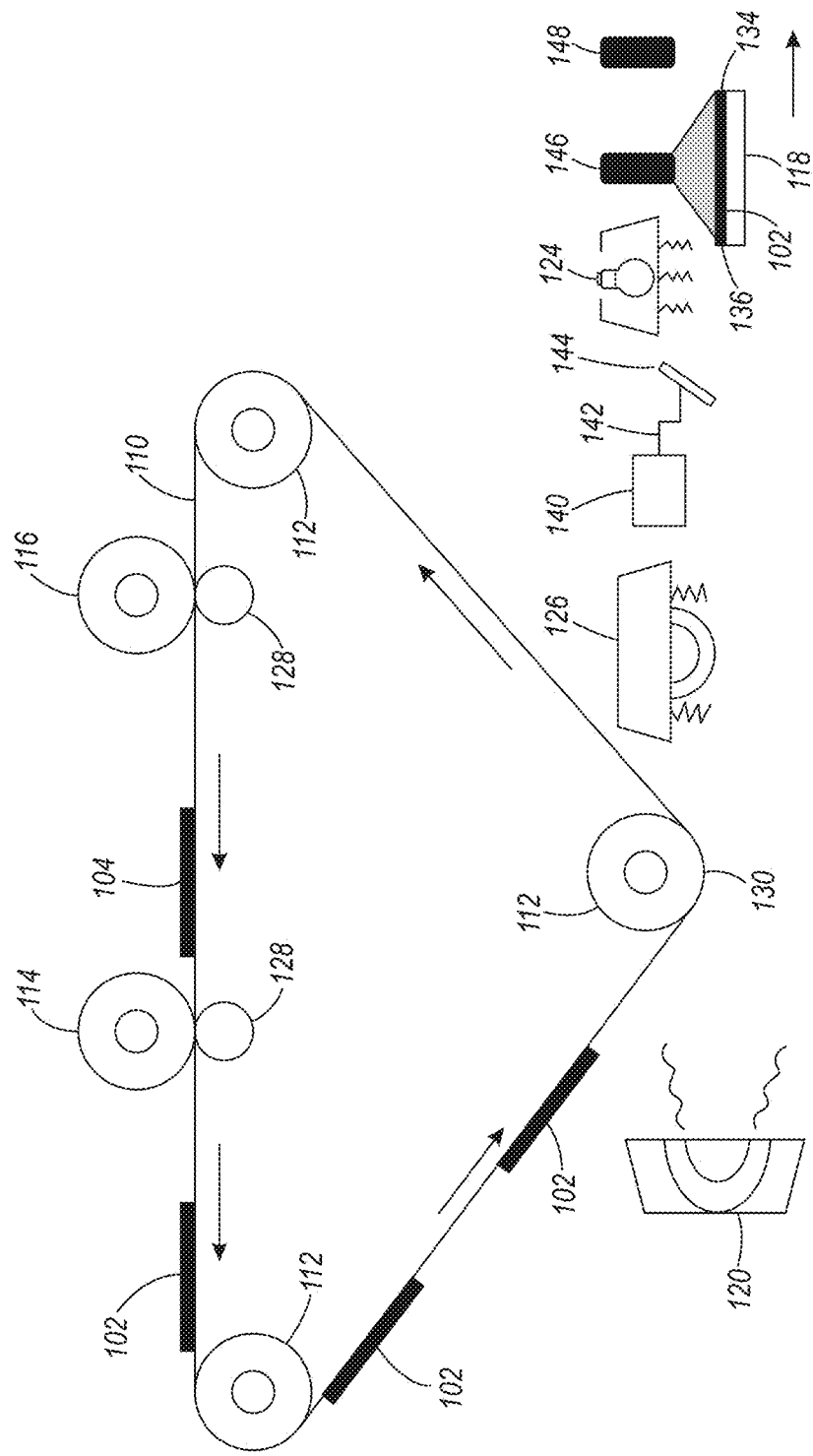

Additionally, as shown in FIG. 8, the cooling station 146 (or even a cooling pause in processing) can be used to cool the layers 102 on the platen 118 between layer 102 transfers. The cooling station can blow air (potentially cooled and dehumidified air) on the layer 102 on the platen 118, as shown in FIG. 8.

The platen 118 can move to the fusing station 126, curing station 124, and cooling station 146 after each time the ITB 110 transfers each of the developed layers 102 to the platen 118 to independently fuse, cure, and cool each of the developed layers 102. In other alternatives, the platen 118 may only move to the fusing station 126, curing station 124, and cooling station 146 after a specific number (e.g., 2, 3, 4, etc.) of the developed layers 102 have been placed on the platen 118 to allow multiple developed layers 102 to be simultaneously fused, cured, and cooled.

Figure 9:
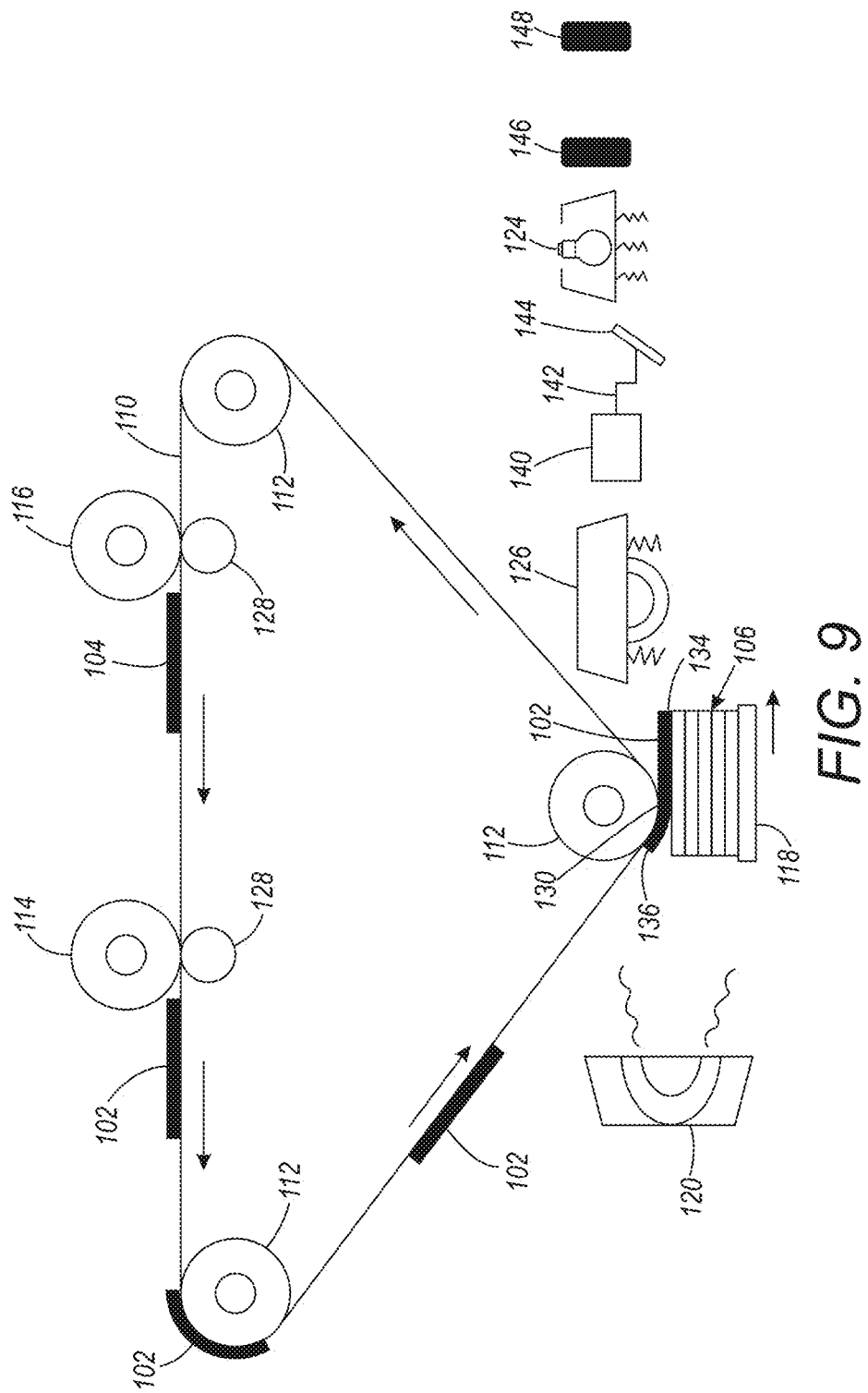
Figure 10:
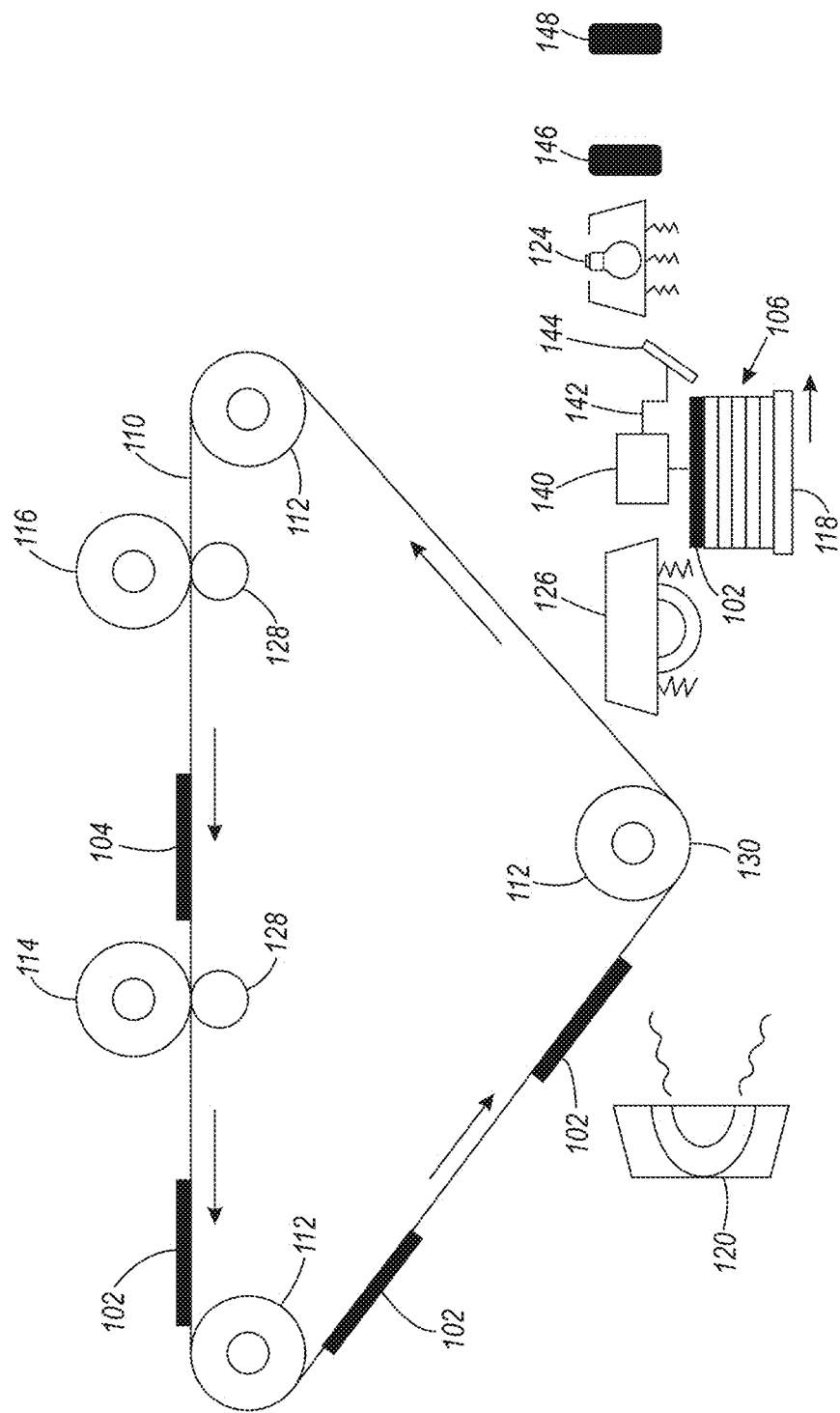
Figure 11:
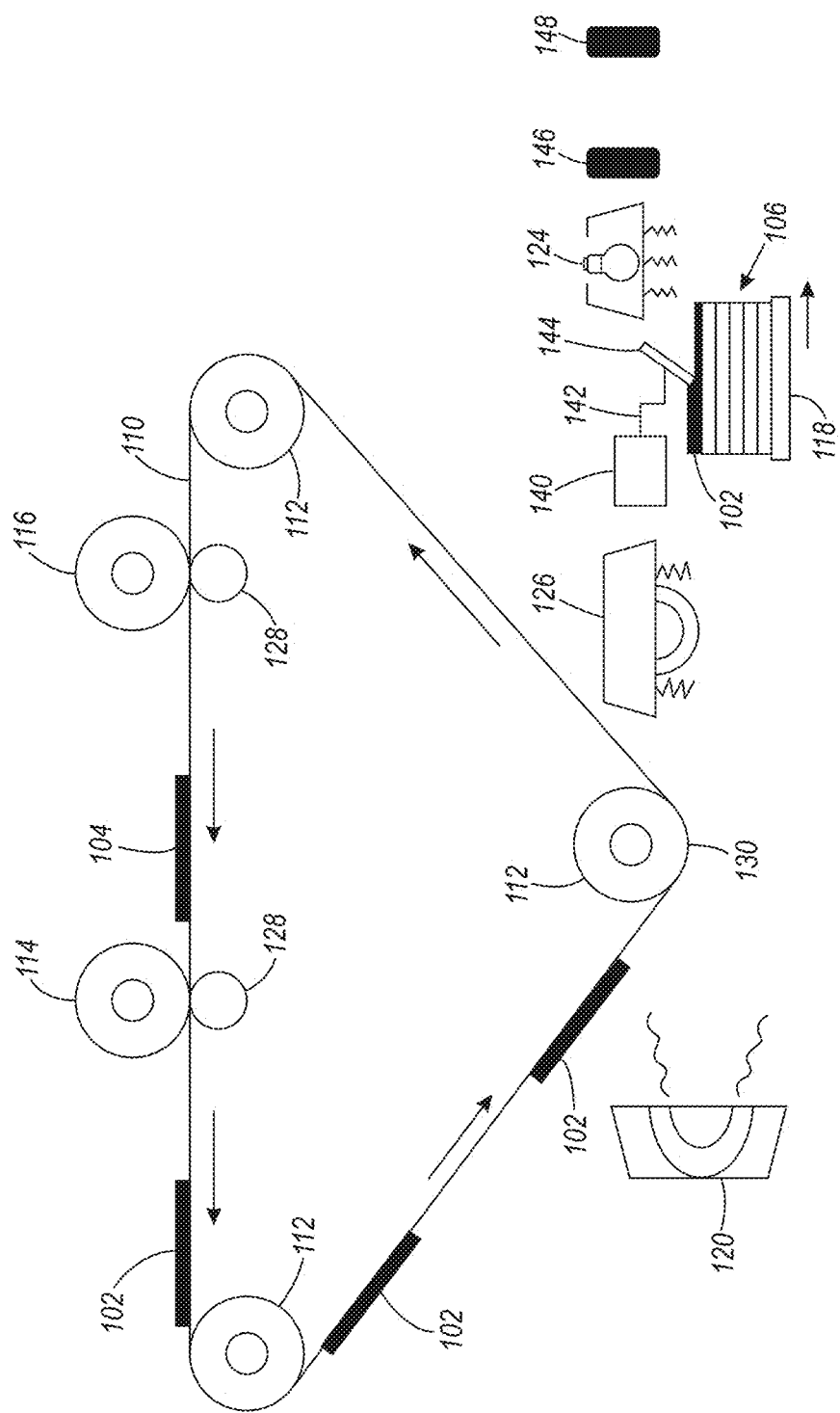

At this point in processing the platen 118 can return to the transfuse nip 130 to receive the next layer 102 from the ITB 110. Thus, the processing in FIGS. 2-8 is repeated to fuse multiple developed layers 102 into a stack 106, as shown in FIG. 9. As the stack 106 of the developed layers 102 grows, additional developed layers 102 are formed on top of the stack 106, as shown in FIG. 10, the thickness of the top layer 102 of such additional developed layers 106 is measured by the sensor 140, and leveled by the mechanical planer 144, as shown in FIG. 11.

Figure 12:
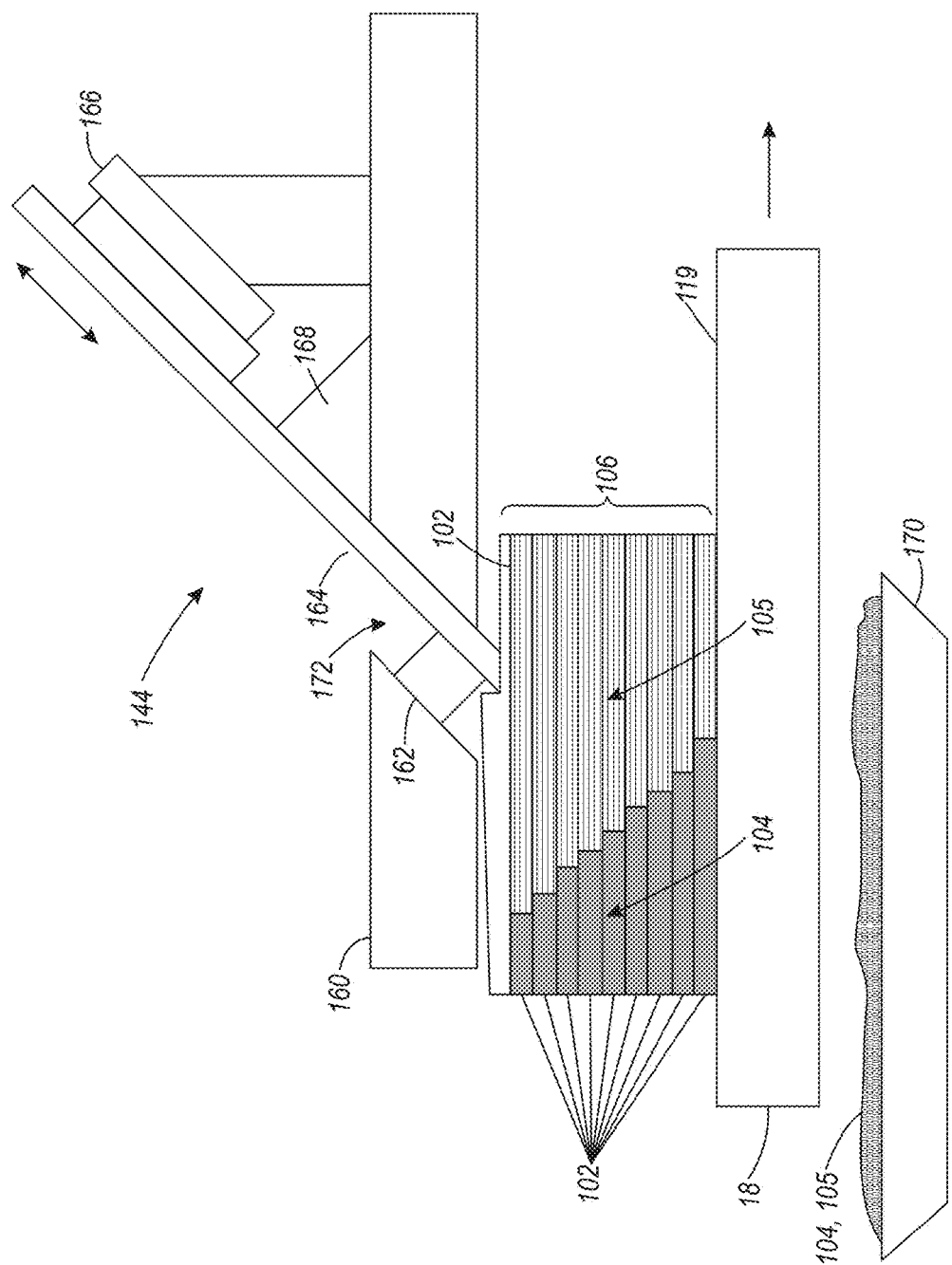
FIG. 12 is an expanded schematic diagram illustrating devices herein.

FIG. 12 shows an expanded view of the mechanical planer 144 and the stack 106 on the platen 118. As described above, each of the layers 102 is made up of some build material 104 and some support material 105. As shown in FIG. 12, the mechanical planer 144 includes an angled blade 164 (e.g., a blade 164 positioned at a non-parallel and non-perpendicular angle to the flat surface 119 of the platen 118). The blade 164 has a beveled edge is rests against to a linear slide 168, which is in turn supported by the blade support 160.

The blade 164 is movable, and an actuator 166 is connected to the movable blade 164. The actuator 166 moves the movable blade 164 toward and away from the platen 118 to remove a greater amount or a lesser amount of the top layer 102 of the stack 106 as the platen moves past the mechanical planer 144 (shown by horizontal arrow in FIG. 12). The actuator 166 (such as a stepper motor, a hydraulic actuator, a pneumatic actuator, a magnetic actuator, etc.) is connected to the blade 164 and is used to advance and retract the blade 164 through an angled opening 172 in the blade support 160 as needed to ensure that the proper leveling "height" is achieved (based on the thickness/topography detected by the sensor 140). Thus, as can be seen in FIG. 12, the portion of the top layer 102 that is to the right of the blade 164 has been scraped by the blade 164 and is therefore relatively thinner and parallel to the top surface 119 of the platen 118; while the portion of the top layer 102 that is to the left of the blade 164 has not yet been scraped by the blade 164 and is therefore relatively thicker and not fully parallel to the top surface 119 of the platen 118.

This structure can additionally include a collection tray 170 adjacent the mechanical planer 144. The collection tray 170 is positioned to collect the build and support material 104, 105 removed from the top layer 102 by the mechanical planer 144. In the drawings, the top layer 102 is the layer 102 in the stack 106 that is furthest from the platen 118.

Also, a cleaning structure can be located in a fixed position within the opening 172, and the cleaning structure contacts and cleans the movable blade 164 as the actuator 166 moves the movable blade 164 past the cleaning structure 162. The cleaning structure 162 can be a fibrous material, such as a natural or artificial sponge, brush, cloth, pad, abrasive surface, etc. At a predefined interval, the stepper motor 166 is actuated to rub the blade 164 edge along (e.g., back and forth across) the scrubbing pad 162 in order to remove any cooled material 104, 105 that may build up on the blade 164. This material 104, 105, will fall into the container 170 located under the blade 164 station while the cleaning operation is carried out.

Figure 13:
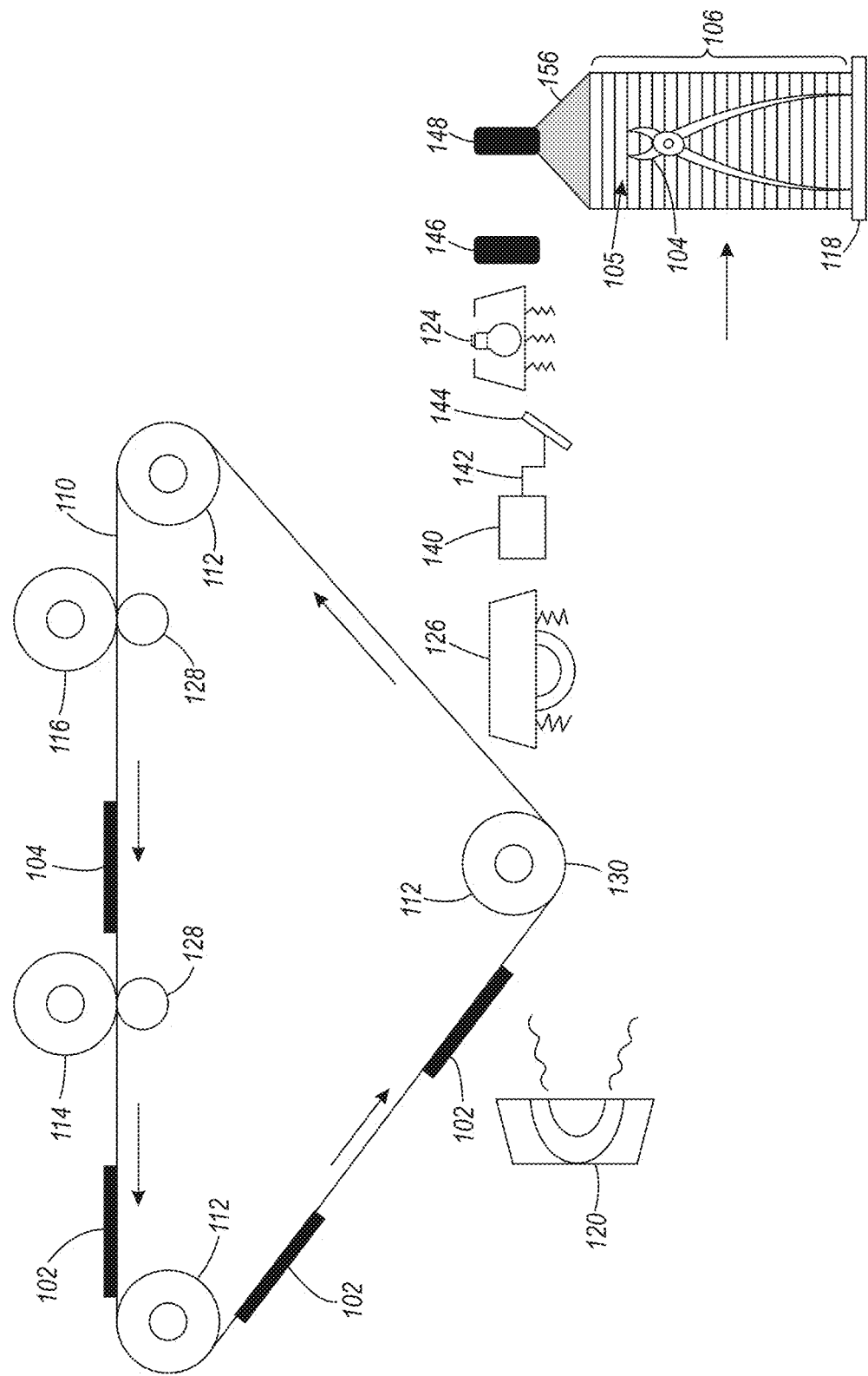
FIGS. 13-19 are schematic cross-section diagrams partially illustrating printing devices herein.

The processing described above is repeated many times to form the freestanding stack 106 of build and support material 104, 105 as shown in FIG. 13. FIG. 13 illustrates an overlay showing portions of support material 105 and build material 104 within the accumulation of the freestanding stack 106. Such may or may not be visible, and is only illustrated to show one exemplary way in which such build and support materials 104, 105 may be arranged.

Figure 14:
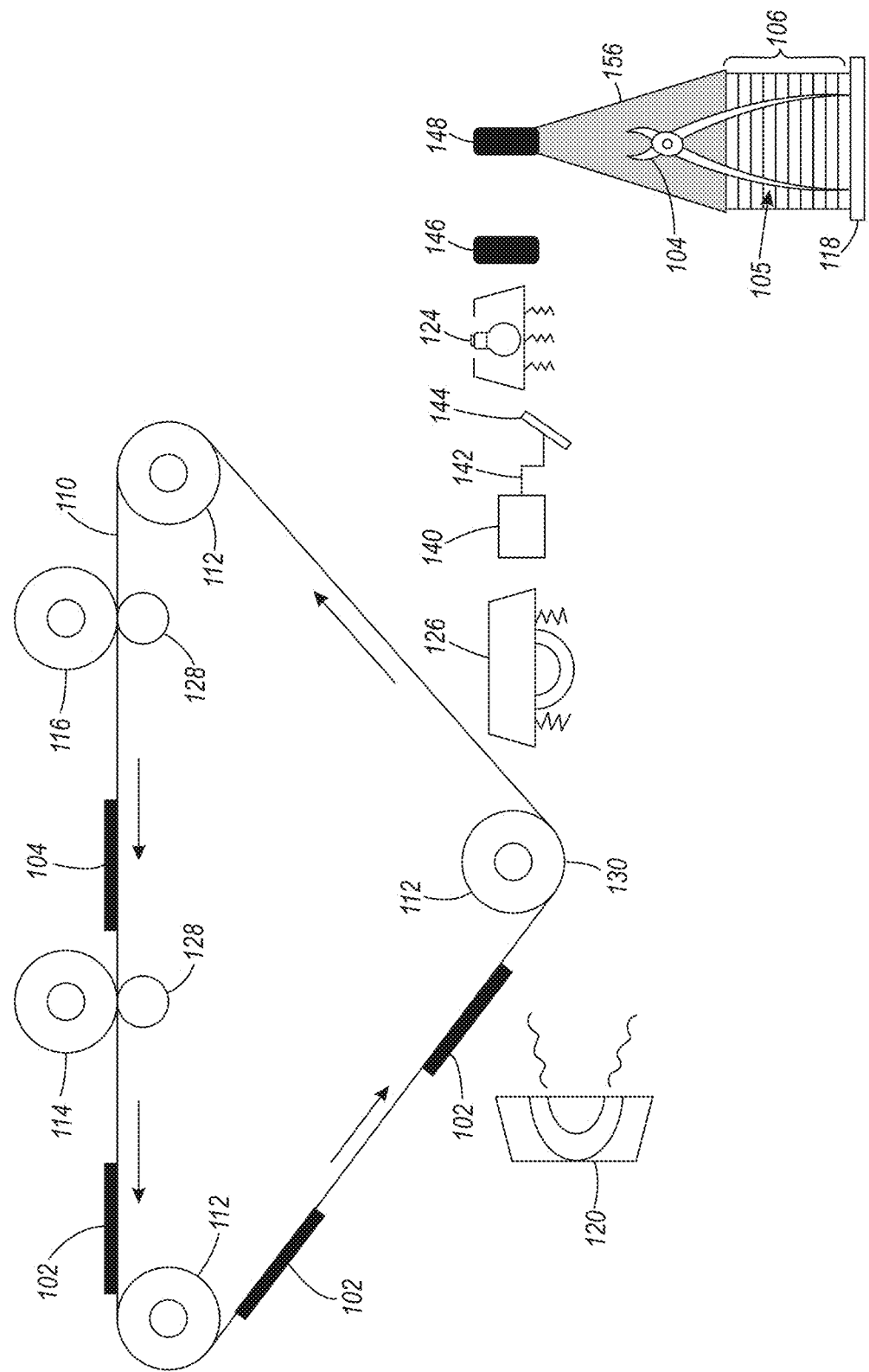
Figure 15:
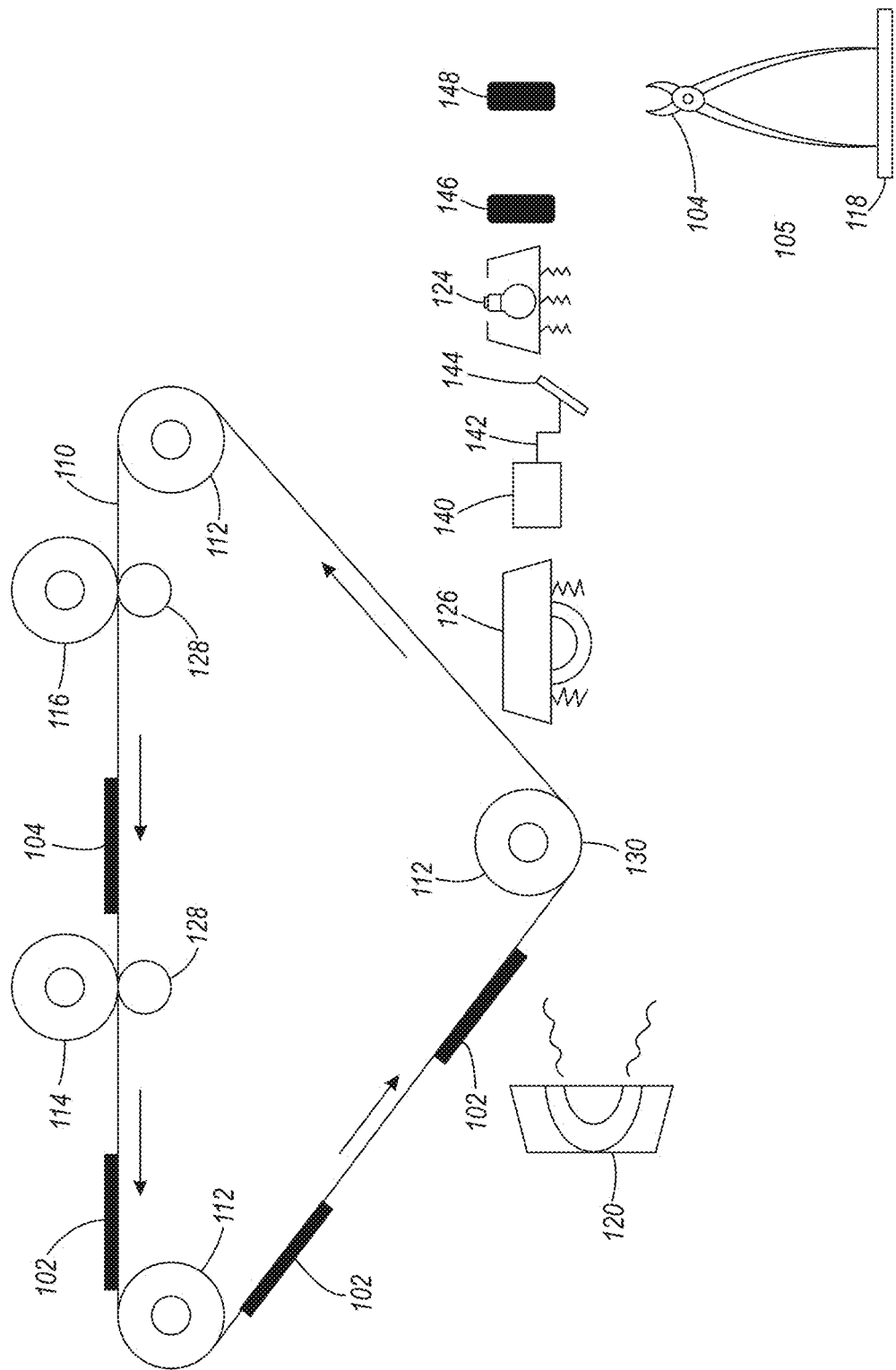

The 3-D structure of the freestanding stack 106 can be output to allow manual removal of the support material 105 using external heated bath; or processing can proceed as shown in FIG. 13-15. More specifically, in FIG. 13, the support material removal station 148 is positioned to receive the now bonded 3-D freestanding stack 106 on the platen 118. The support material removal station 148 applies a solvent 156 that dissolves the support material 105 without affecting the build material 104. Again, as noted above, the solvent utilized will depend upon the chemical makeup of the build material 104 and the support material 105. FIG. 14 illustrates the processing where about half of the support material 105 remains, and a portion of the build material 104 protrudes from the remaining stack of support material 105. FIG. 15 illustrates processing after the support material removal station 148 has applied sufficient solvent 156 to dissolve all the support material 105, leaving only the build material 104 remaining, which leave a completed 3-D structure made of only the build material 104.

Figure 16:
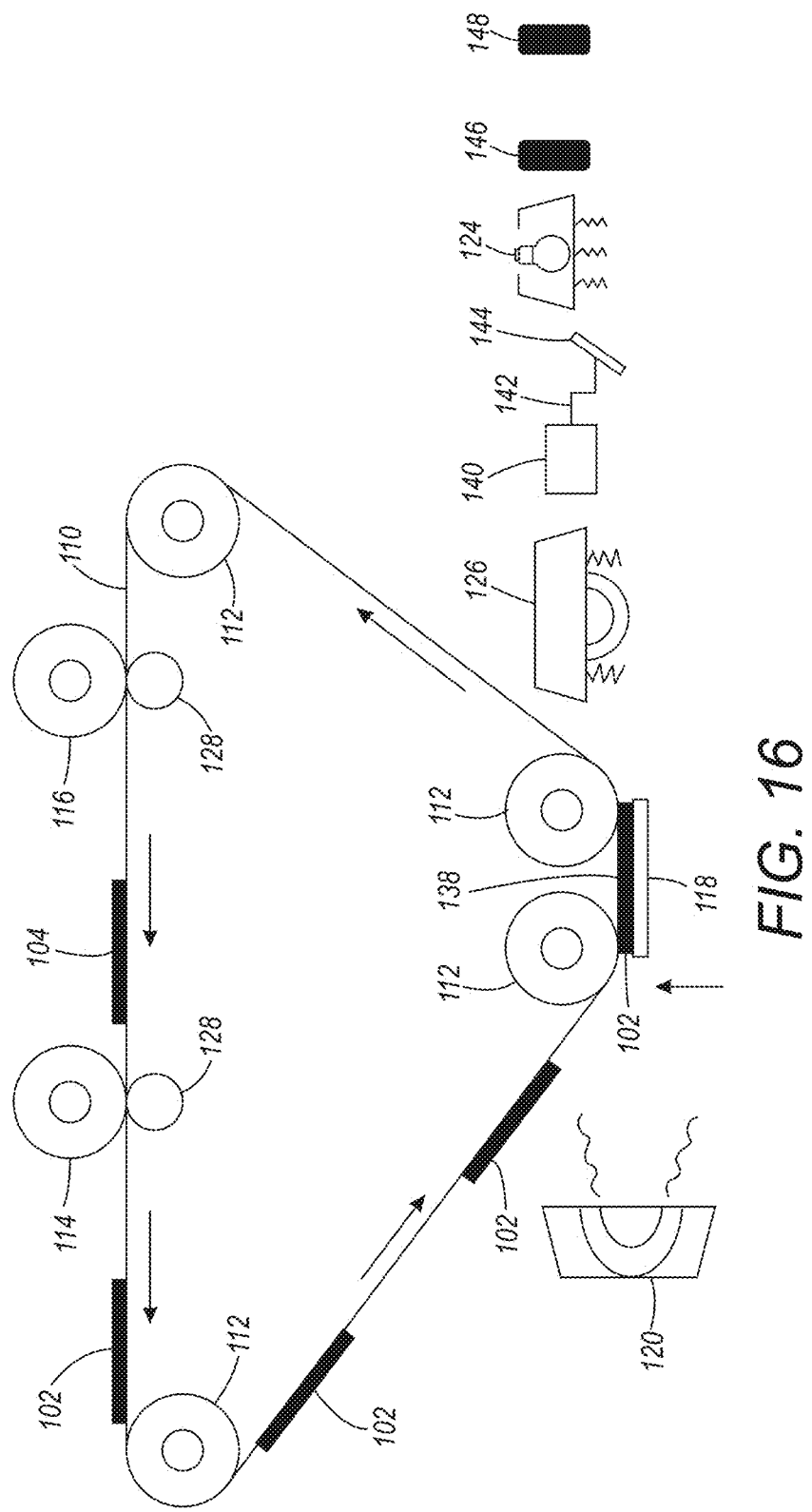
Figure 17:
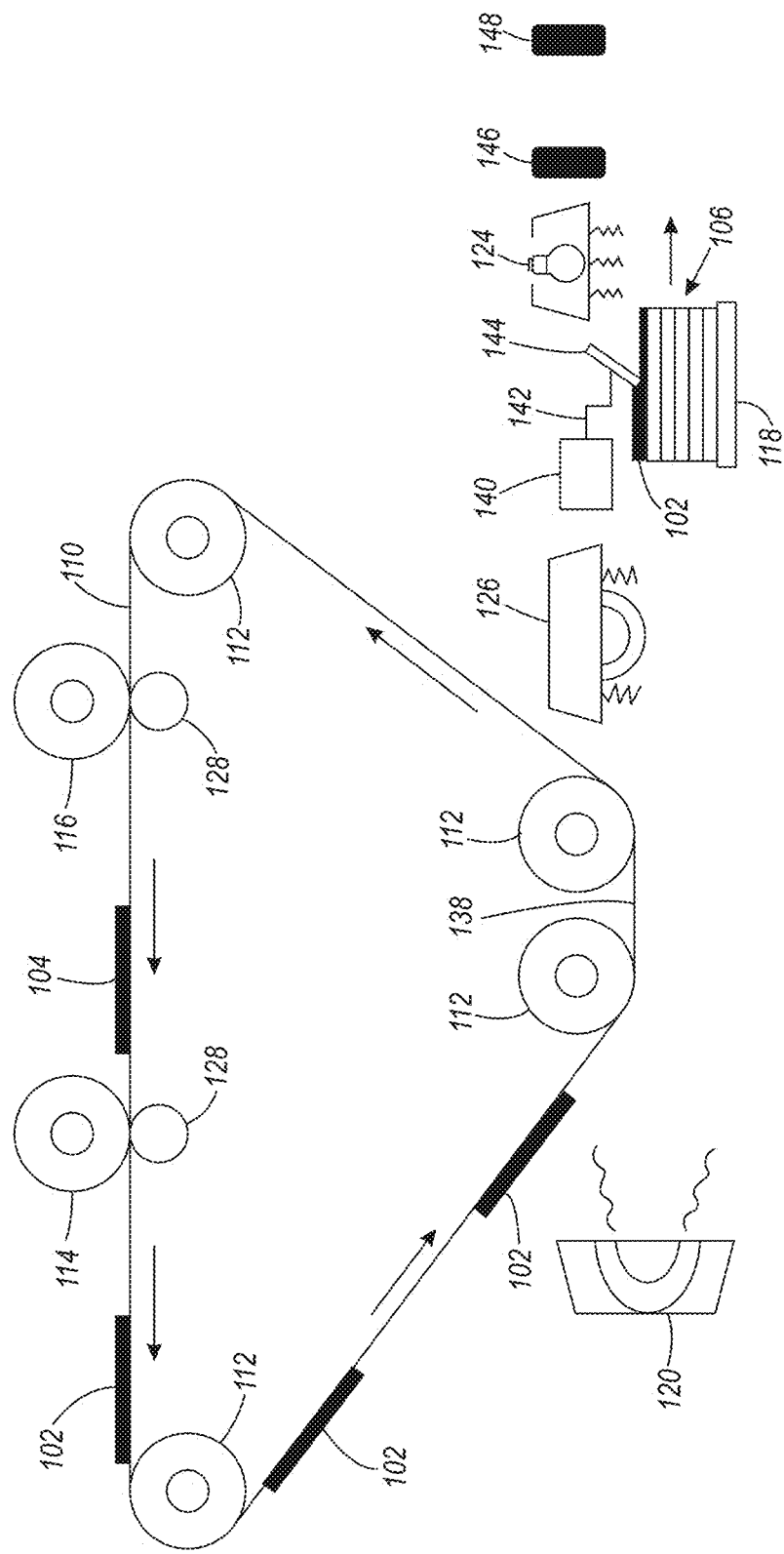

FIGS. 16-17 illustrate an alternative 3-D electrostatic printing structure herein that includes a planar transfuse station 138 in place of the transfuse nip 130 shown in FIG. 1. As shown in FIG. 16, the planar transfuse station 138 is a planar portion of the ITB 110 that is between rollers 112 and is parallel to the platen 118. As shown in FIG. 16, with this structure, when the platen 118 moves to contact the planar transfuse station 138, all of the developed layer 102 is transferred simultaneously to the platen 118 or partially formed stack 106, avoiding the rolling transfuses process shown in FIGS. 2 and 3. FIG. 17 illustrates that the mechanical planer 144 levels the top layer 102 to keep the layers 102 within the stack 106 parallel with the upper surface 119 of the platen 118, as discussed above.

Figure 18:
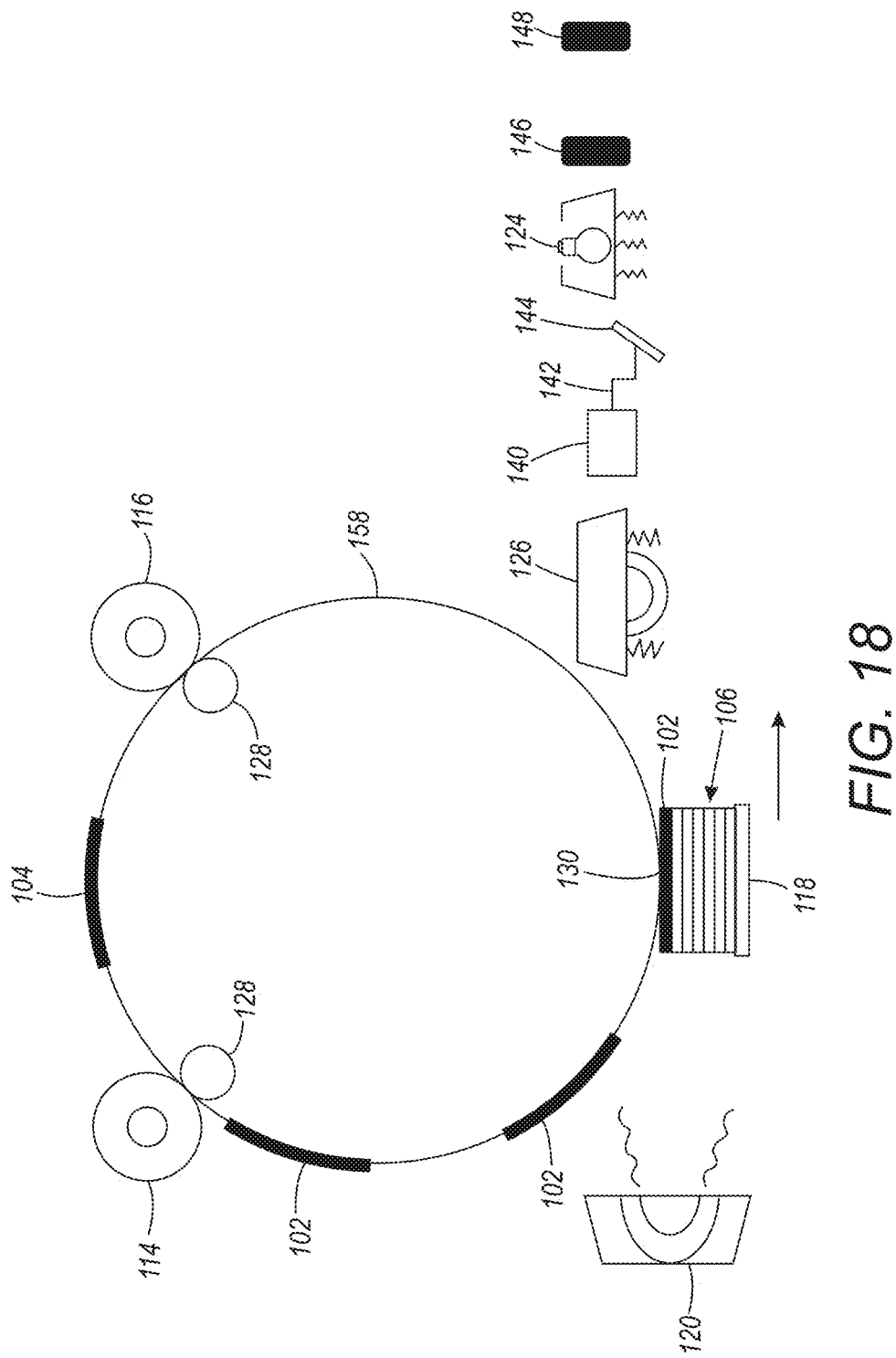
Figure 19:
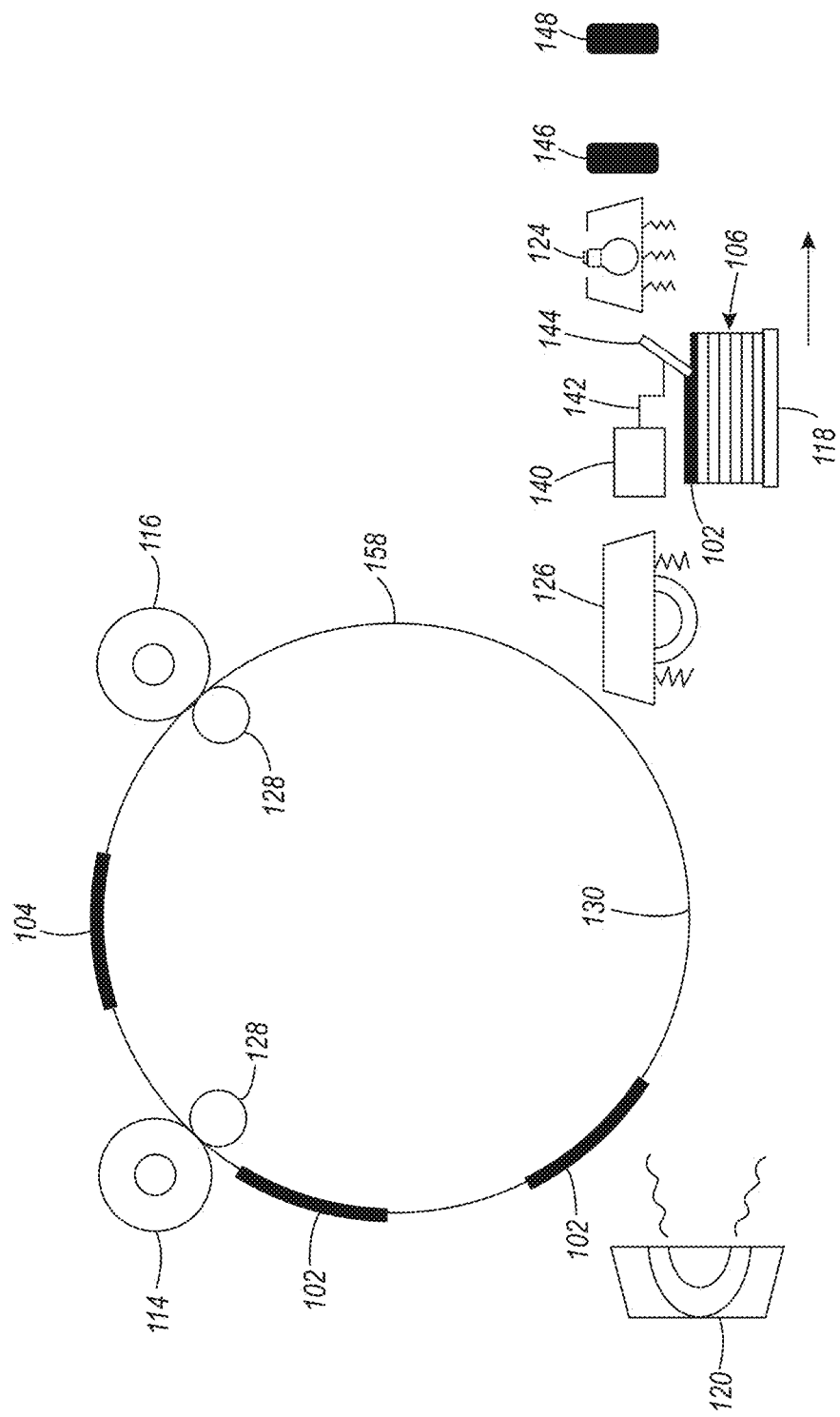

Similarly, as shown in FIGS. 18 and 19, a drum 158 could be used in place of the ITB 110, with all other components operating as described herein. Thus, the drum 158 could be an intermediate transfer surface receiving material from development stations 114, 116, as described above, or could be a photoreceptor and operate as the photoreceptor 256 described below operates, by maintaining a latent image of charge and receiving materials from development devices 254. As shown in FIG. 19, the mechanical planer 144 levels the layer 102 to keep the layers 102 within the stack 106 parallel with the upper surface 119 of the platen 118, as discussed above.

Figure 20:
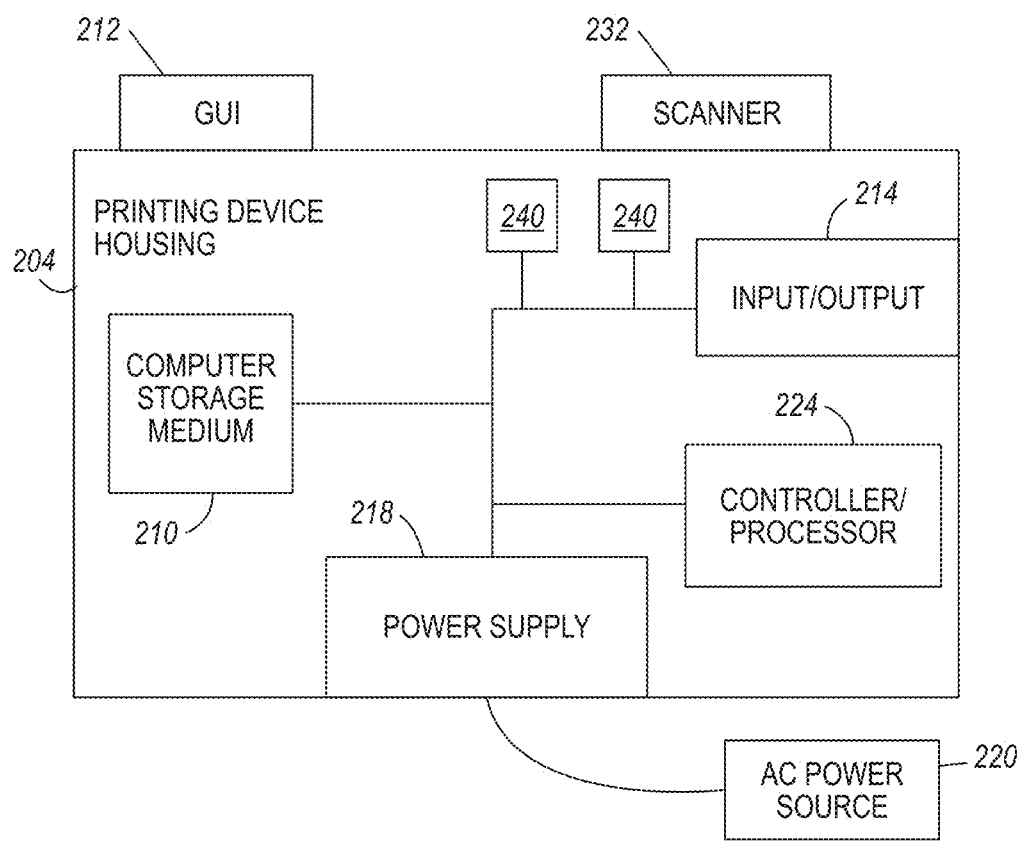
FIG. 20 is a schematic diagram illustrating a printing device herein.

FIG. 20 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 20, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 21:
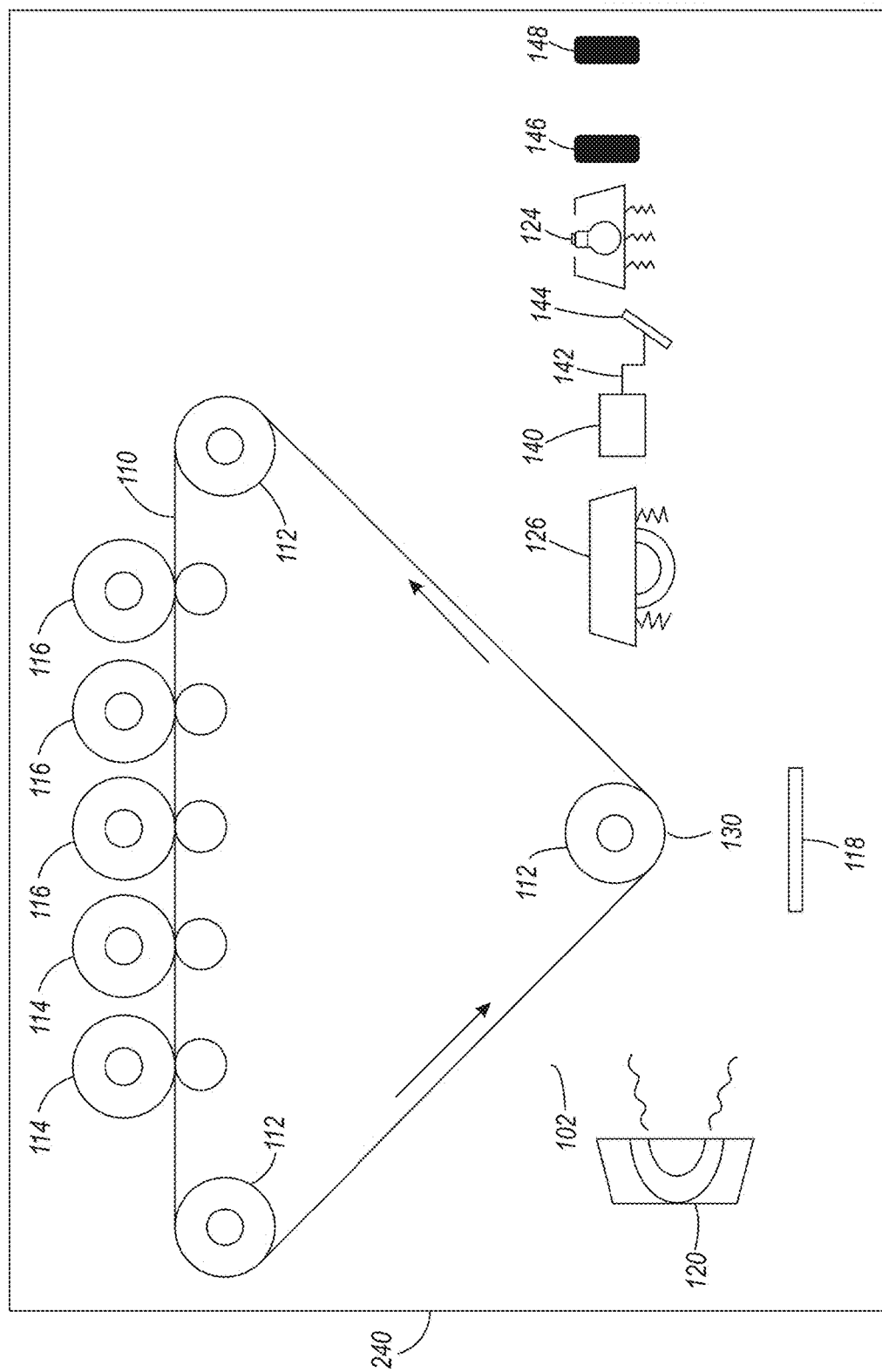
FIG. 21 is a schematic diagram partially illustrating a printing device herein.

The one or more printing engines 240 are intended to illustrate any marking device that applies build and support materials (toner, etc.) whether currently known or developed in the future and can include, for example, devices that use an intermediate transfer belt 110 (as shown in FIG. 21).

Thus, as shown in FIG. 21, each of the printing engine(s) 240 shown in FIG. 20 can utilize one or more potentially different (e.g., different color, different material, etc.) build material development stations 116, one or more potentially different (e.g., different color, different material, etc.) support material development stations 114, etc. The development stations 114, 116 can be any form of development station, whether currently known or developed in the future, such as individual electrostatic marking stations, individual inkjet stations, individual dry ink stations, etc. Each of the development stations 114, 116 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110. While FIG. 21 illustrates five development stations adjacent or in contact with a rotating belt (110), as would be understood by those ordinarily skilled in the art, such devices could use any number of marking stations (e.g., 2, 3, 5, 8, 11, etc.).

Figure 22:
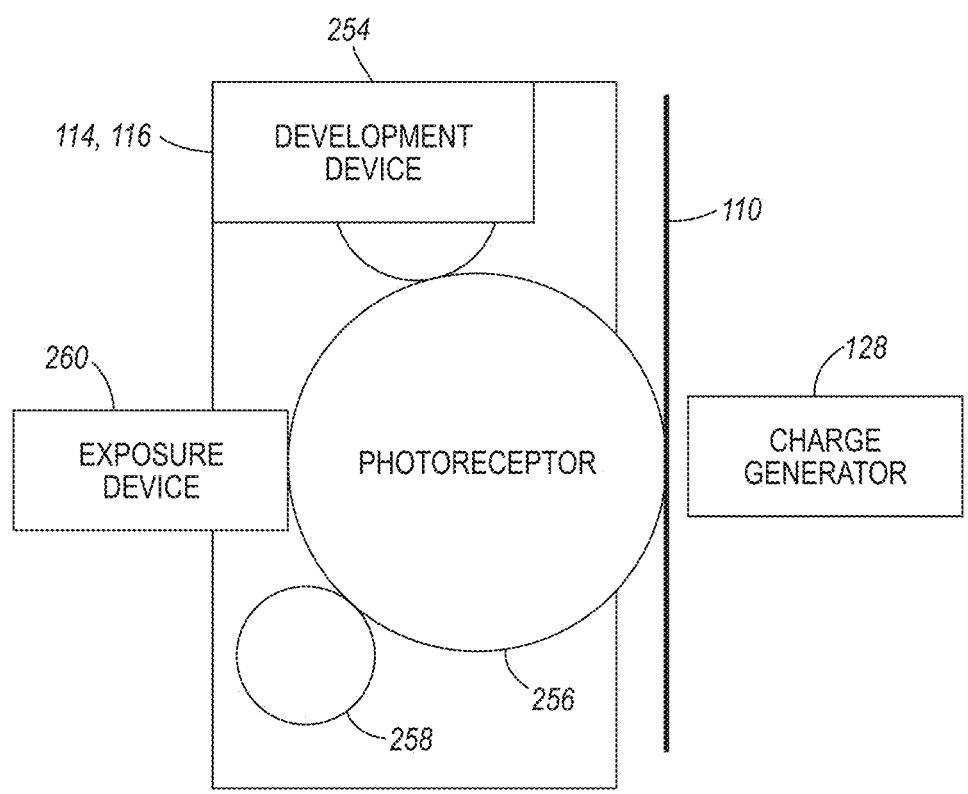
FIG. 22 is a schematic diagram illustrating a development device herein.

One exemplary individual electrostatic development station 114, 116 is shown in FIG. 22 positioned adjacent to (or potentially in contact with) intermediate transfer belt 110. Each of the individual electrostatic development stations 114, 116 includes its own charging station 258 that creates a uniform charge on an internal photoreceptor 256, an internal exposure device 260 that patterns the uniform charge into a latent image of charge, and an internal development device 254 that transfers build or support material to the photoreceptor 256 in a pattern matching the charge latent image. The pattern of build or support material is then drawn from the photoreceptor 256 to the intermediate transfer belt 110 by way of an opposite charge of the intermediate transfer belt 110 relative to the charge of the build or support material, that is usually created by a charge generator 128 on the opposite side of the intermediate transfer belt 110.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
   an intermediate transfer surface;
   a build material development station positioned to transfer build material to said intermediate transfer surface;
   a support material development station positioned to transfer support material to said intermediate transfer surface, said build material development station and said support material development station transfer layers of said build material and said support material to said intermediate transfer surface;
   a platen having a flat surface positioned to contact said intermediate transfer surface, said intermediate transfer surface transfers a layer of said build material and said support material to said platen, or existing layers on said platen, each time said platen, or said existing layers, contact said intermediate transfer surface;
   a sensor detecting the thickness of said layer on said platen;
   a mechanical planer positioned to contact and level said layer on said platen as said platen moves past said mechanical planer, wherein said sensor is positioned between said mechanical planer and a location where said platen contacts said intermediate transfer surface; and
   a feedback loop electrically connected to said sensor and said mechanical planer, said mechanical planer adjusts the amount of material removed from said layer based on said thickness of said layer on said platen, as determined by said sensor.

2. The 3-D printer according to claim 1, said mechanical planer comprises a blade positioned at a non-parallel and non-perpendicular angle to said flat surface of said platen.

3. The 3-D printer according to claim 1, said mechanical planer comprises a movable blade and an actuator connected to said movable blade, said actuator moves said movable blade toward and away from said platen.

4. The 3-D printer according to claim 3, said mechanical planer comprises a cleaning structure in a fixed position, said cleaning structure contacts and cleans said movable blade as said actuator moves said movable blade past said cleaning structure.

5. The 3-D printer according to claim 1, further comprising a collection tray adjacent said mechanical planer, said collection tray is positioned to collect said build material and said support material removed from said layer by said mechanical planer.

6. The 3-D printer according to claim 1, said mechanical planer makes the top of said layer parallel to said flat surface of said platen.

7. The 3-D printer according to claim 1, said mechanical planer reduces said thickness of said layer.

8. A three-dimensional (3-D) printer comprising:
   an intermediate transfer surface;
   a build material development station positioned to transfer build material to said intermediate transfer surface;
   a support material development station positioned to transfer support material to said intermediate transfer surface, said build material development station and said support material development station transfer layers of said build material and said support material to said intermediate transfer surface;
   a platen having a flat surface positioned to contact said intermediate transfer surface, said intermediate transfer surface transfers a layer of said build material and said support material to said platen, or existing layers on said platen, each time said platen, or said existing layers, contact said intermediate transfer surface;
   a sensor detecting the thickness of said layer on said platen;
   a mechanical planer positioned to contact and level said layer on said platen as said platen moves past said mechanical planer, wherein said sensor is positioned between said mechanical planer and a location where said platen contacts said intermediate transfer surface; and
   a feedback loop electrically connected to said sensor and said mechanical planer, said mechanical planer moves toward and away from said platen to adjust the amount of material removed from said layer based on said thickness of said layer on said platen, as determined by said sensor.

9. The 3-D printer according to claim 8, said mechanical planer comprises a blade positioned at a non-parallel and non-perpendicular angle to said flat surface of said platen.

10. The 3-D printer according to claim 8, said mechanical planer comprises a movable blade and an actuator connected to said movable blade, said actuator moves said movable blade toward and away from said platen.

11. The 3-D printer according to claim 10, said mechanical planer comprises a cleaning structure in a fixed position, said cleaning structure contacts and cleans said movable blade as said actuator moves said movable blade past said cleaning structure.

12. The 3-D printer according to claim 8, further comprising a collection tray adjacent said mechanical planer, said collection tray is positioned to collect said build material and said support material removed from said layer by said mechanical planer.

13. The 3-D printer according to claim 8, said mechanical planer makes the top of said layer parallel to said flat surface of said platen.

14. The 3-D printer according to claim 8, said mechanical planer reduces said thickness of said layer.

15. A three-dimensional (3-D) printer comprising:
    an intermediate transfer surface;
    a build material development station positioned to transfer build material to said intermediate transfer surface;
    a support material development station positioned to transfer support material to said intermediate transfer surface, said build material development station and said support material development station transfer layers of said build material and said support material to said intermediate transfer surface;

a platen having a flat surface positioned to contact said intermediate transfer surface, said intermediate transfer surface transfers a layer of said build material and said support material to said platen, or existing layers on said platen, each time said platen, or said existing layers, contact said intermediate transfer surface;

a sensor detecting the thickness of said layer on said platen;

a mechanical planer positioned to contact and level said layer on said platen by removing material from said layer as said platen moves past said mechanical planer, wherein said sensor is positioned between said mechanical planer and a location where said platen contacts said intermediate transfer surface; and a feedback loop electrically connected to said sensor and said mechanical planer, said mechanical planer moves toward and away from said platen to adjust the amount of material removed from said layer based on said thickness of said layer on said platen, as determined by said sensor.

16. The 3-D printer according to claim 15, said mechanical planer comprises a blade positioned at a non-parallel and non-perpendicular angle to said flat surface of said platen.

17. The 3-D printer according to claim 15, said mechanical planer comprises a movable blade and an actuator connected to said movable blade, said actuator moves said movable blade toward and away from said platen.

18. The 3-D printer according to claim 17, said mechanical planer comprises a cleaning structure in a fixed position, said cleaning structure contacts and cleans said movable blade as said actuator moves said movable blade past said cleaning structure.

19. The 3-D printer according to claim 15, further comprising a collection tray adjacent said mechanical planer, said collection tray is positioned to collect said build material and said support material removed from said layer by said mechanical planer.

20. The 3-D printer according to claim 15, said mechanical planer makes the top of said layer parallel to said flat surface of said platen.

* * * * *